US010788857B2

(12) United States Patent
Huang et al.

(10) Patent No.: US 10,788,857 B2
(45) Date of Patent: Sep. 29, 2020

(54) DOCK FOR A PORTABLE ELECTRONIC DEVICE

(71) Applicant: ACCO Brands Corporation, Lake Zurich, IL (US)

(72) Inventors: Yu-Chia Huang, New Taipei (TW); Alex James Klinkman, Hayward, CA (US)

(73) Assignee: ACCO Brands Corporation, Lake Zurich, IL (US)

(*) Notice: Subject to any disclaimer, the term of this patent is extended or adjusted under 35 U.S.C. 154(b) by 0 days.

(21) Appl. No.: 16/122,120

(22) Filed: Sep. 5, 2018

(65) Prior Publication Data

US 2020/0073438 A1 Mar. 5, 2020

(51) Int. Cl.
*G06F 1/16* (2006.01)

(52) U.S. Cl.
CPC .......... *G06F 1/1632* (2013.01); *G06F 1/1624* (2013.01); *G06F 1/1679* (2013.01)

(58) Field of Classification Search
CPC ...... G06F 1/1632; G06F 1/1624; G06F 1/167; G06F 1/1679
See application file for complete search history.

(56) References Cited

U.S. PATENT DOCUMENTS

| | | | |
|---|---|---|---|
| 4,453,692 | A | 6/1984 | LeDoux et al. |
| D332,091 | S | 12/1992 | Iino |
| 5,305,381 | A | 4/1994 | Wang et al. |
| D354,280 | S | 1/1995 | Fenton |
| D355,173 | S | 2/1995 | Fenton et al. |
| D355,412 | S | 2/1995 | Rak et al. |
| D358,834 | S | 5/1995 | Cox |
| D359,065 | S | 6/1995 | Cox |
| 5,457,745 | A | 10/1995 | Wang et al. |
| 5,461,546 | A | 10/1995 | Kobayashi et al. |
| 5,553,824 | A | 9/1996 | Dutra, Jr. |
| 5,595,074 | A | 1/1997 | Munro |

(Continued)

FOREIGN PATENT DOCUMENTS

| | | | |
|---|---|---|---|
| EP | 2866120 | A1 | 4/2015 |
| GB | 2286630 | A | 8/1995 |

(Continued)

OTHER PUBLICATIONS

Extended European Search Report and Search Opinion for Application No. 19183871.3 dated Jan. 24, 2020 (11 pages).

*Primary Examiner* — James Wu
(74) *Attorney, Agent, or Firm* — Michael Best & Friedrich LLP

(57) ABSTRACT

A dock for a portable electronic device includes a base and an arm movably supported on the base. The arm has a ratchet gear set and a distal end configured to engage the portable electronic device to secure the portable electronic device to the base. The dock further includes a ratchet pawl positioned within the base. The ratchet pawl is movable between a first position, in which the ratchet pawl engages the ratchet gear set to inhibit movement of the arm relative to the base, and a second position, in which the ratchet pawl disengages the ratchet gear set to allow movement of the arm relative to the base. The dock further includes an electronic actuator operable to actuate the ratchet pawl from the first position to the second position.

23 Claims, 15 Drawing Sheets

(56) References Cited

U.S. PATENT DOCUMENTS 5,788,202 A 8/1998 Richter
5,816,076 A 10/1998 Biedermann et al.
5,903,645 A 5/1999 Tsay
D415,740 S 10/1999 Lee et al.
D415,741 S 10/1999 Lee et al.
6,006,557 A 12/1999 Carl et al.
D423,039 S 4/2000 Cox
6,069,790 A 5/2000 Howell et al.
6,072,695 A 6/2000 Steiger et al.
6,102,284 A * 8/2000 Myers .................. G06F 1/1632 235/375
6,115,247 A 9/2000 Helot
D434,417 S 11/2000 Lin
6,185,095 B1 2/2001 Helot et al.
6,212,921 B1 4/2001 Knighton
6,256,387 B1 7/2001 Wang
D448,385 S 9/2001 Oross et al.
D450,708 S 11/2001 Hsu
6,320,962 B1 11/2001 Eisenbraun
6,490,154 B2 12/2002 Thompson
6,533,599 B1 3/2003 Singleton, Jr.
6,560,101 B1 5/2003 Oross et al.
6,560,710 B1 5/2003 Leyden et al.
D478,087 S 8/2003 Aldridge
6,667,881 B2 12/2003 Oross et al.
6,711,921 B1 3/2004 Yang
6,796,536 B1 9/2004 Sevier, IV
D504,148 S 4/2005 Smith et al.
6,883,694 B2 4/2005 Abelow
D507,808 S 7/2005 Smith et al.
6,913,238 B2 7/2005 Bakker et al.
D512,066 S 11/2005 Solomon et al.
7,007,912 B1 3/2006 Giuliani et al.
7,032,872 B2 4/2006 Sullivan
D532,368 S 11/2006 Yamada
7,174,752 B2 2/2007 Galant
D554,582 S 11/2007 Iseki
7,315,443 B2 1/2008 Allen
7,324,333 B2 1/2008 Allen
7,407,143 B1 8/2008 Chen
7,443,665 B2 10/2008 Allen
7,506,592 B2 3/2009 Rossini
7,633,750 B2 12/2009 Fan et al.
7,724,520 B2 5/2010 Allen
D638,010 S 5/2011 de Wilde et al.
8,139,356 B2 3/2012 Allen
8,223,488 B2 7/2012 Peter
8,567,737 B2 10/2013 Chen
D701,213 S 3/2014 Pajic
8,708,296 B2 4/2014 Nemoto
8,717,758 B2 5/2014 Allen
8,727,192 B2 5/2014 Lai
8,777,173 B2 7/2014 Nemoto
8,837,144 B1 9/2014 Allen
8,882,069 B2 11/2014 Mahaffey et al.
9,004,434 B2 4/2015 Kang et al.
D732,036 S 6/2015 Lee et al.
9,047,051 B2 6/2015 Yu et al.
9,115,843 B2 8/2015 Huang
9,194,532 B2 11/2015 Bisesti et al.
9,206,626 B2 12/2015 Allen
9,334,679 B2 5/2016 Lin
9,388,939 B2 7/2016 Girault
D768,069 S 10/2016 Hoshikawa
9,486,897 B2 11/2016 Trotsky
9,562,375 B2 2/2017 Allen
9,573,532 B2 2/2017 Riddiford et al.
9,650,810 B2 5/2017 Grziwok et al.
D795,876 S 8/2017 Fletcher et al.
9,797,543 B2 10/2017 Lin
10,125,523 B2 11/2018 Allen
D851,646 S 6/2019 Huebner
2003/0128506 A1 7/2003 Won et al.
2004/0007651 A1 1/2004 Williams et al.
2004/0065126 A1 4/2004 Yang
2004/0177658 A1 9/2004 Mitchell
2005/0077448 A1 4/2005 Rossini
2006/0215836 A1 9/2006 Wang
2006/0250767 A1 11/2006 Brophy et al.
2007/0262223 A1 11/2007 Wang et al.
2009/0294617 A1 12/2009 Stacey et al.
2010/0044534 A1 2/2010 He et al.
2010/0079285 A1 4/2010 Fawcett et al.
2010/0264182 A1 10/2010 Perlman et al.
2011/0062299 A1 3/2011 Tsai
2011/0134601 A1* 6/2011 Sa ......................... G06F 1/1632 361/679.43
2011/0185776 A1* 8/2011 Mahaffey ............ E05B 73/0005 70/58
2012/0312936 A1 12/2012 Huang
2013/0148289 A1* 6/2013 Kwon ................... G06F 1/1632 361/679.43
2014/0069195 A1* 3/2014 Ledbetter ............... G01H 17/00 73/649
2015/0083885 A1 3/2015 Mahaffey et al.
2015/0185709 A1 7/2015 Vroom et al.
2018/0058107 A1 3/2018 Lucas et al.
2018/0132364 A1* 5/2018 Apter ........................ F16B 2/12
2018/0252003 A1 9/2018 Klinkman et al.
2019/0078355 A1 3/2019 Allen
2019/0284843 A1 9/2019 Weng
2020/0073438 A1 3/2020 Huang

FOREIGN PATENT DOCUMENTS

GB 2300879 A 11/1996
WO 2002035037 A1 5/2002

* cited by examiner 12
16
18
36
128
130
14
118
112
78I
38
136
134
116
122
126
114
26
34
140
142
68
66
52
50
60
28

REMOTE APPARATUS
ELECTRONIC DEVICE
10
12
150
DOCK
PROXIMITY DEVICE
ELECTRICAL CONNECTOR
ELECTRONIC ACTUATOR
84
100
74
76
86
CONTROLLER
156
158
PROCESSOR
MEMORY
POWER SUPPLY
PORTS
160
78A-78I

POSITION A COMPUTER ON THE DOCK BETWEEN OPPOSING ARMS
201
MOVE THE ARMS INWARD TO LOCK THE COMPUTER WITHIN THE ARMS
202
PROVIDE A SIGNAL INDICATIVE OF AN UNLOCKING COMMAND TO THE DOCK
203
ACTUATE AN ELECTRONIC ACTUATOR TO DISENGAGE THE ARMS
204
MOVE THE ARMS OUTWARD TO UNLOCK THE COMPUTER FROM THE ARMS
205
DE-ENERGIZE THE ELECTRONIC ACTUATOR
206

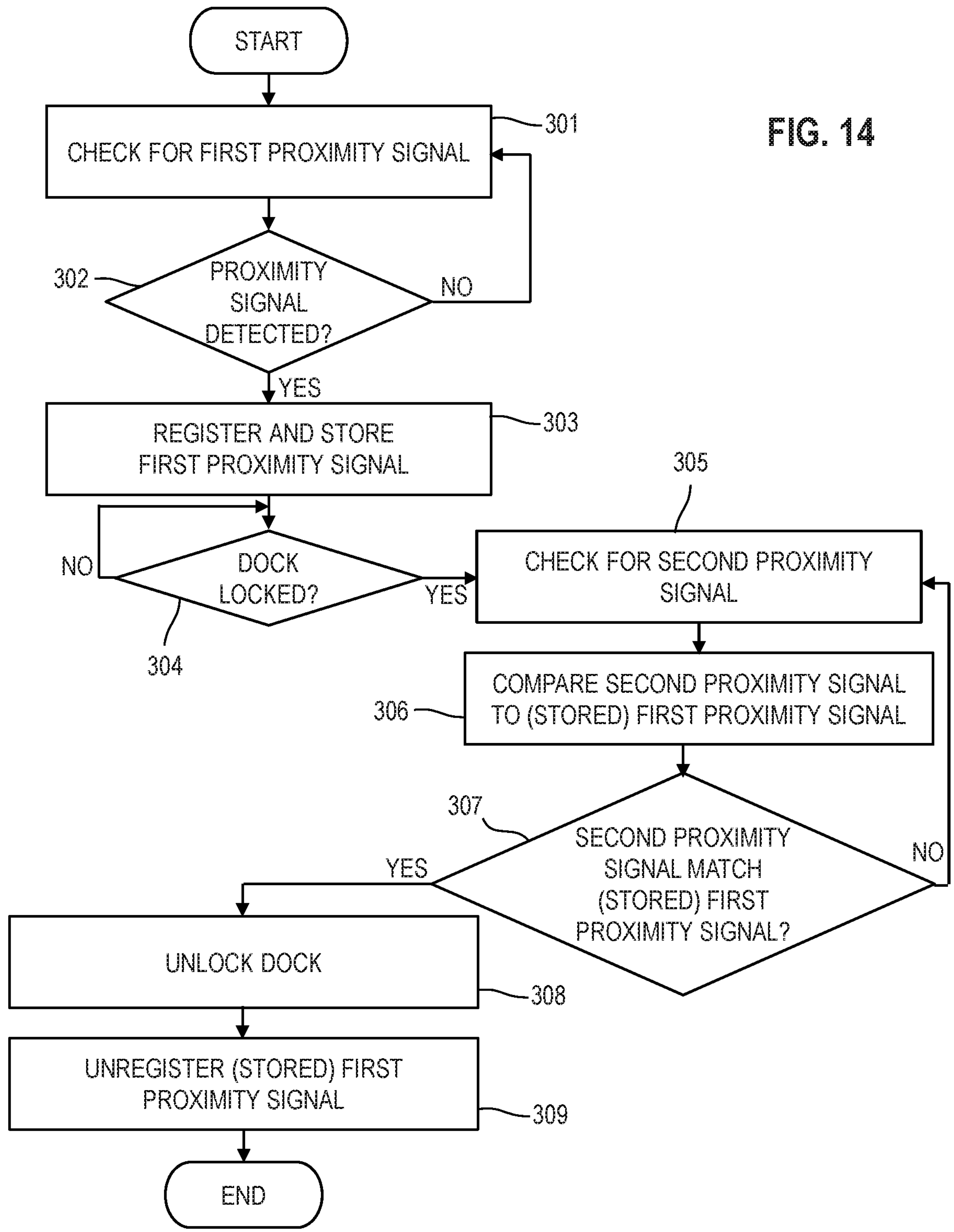
START
CHECK FOR FIRST PROXIMITY SIGNAL
301
FIG. 14
302
PROXIMITY SIGNAL DETECTED?
NO
YES
REGISTER AND STORE FIRST PROXIMITY SIGNAL
303
305
NO
DOCK LOCKED?
YES
CHECK FOR SECOND PROXIMITY SIGNAL
304
COMPARE SECOND PROXIMITY SIGNAL TO (STORED) FIRST PROXIMITY SIGNAL
306
307
SECOND PROXIMITY SIGNAL MATCH (STORED) FIRST PROXIMITY SIGNAL?
YES
NO
UNLOCK DOCK
308
UNREGISTER (STORED) FIRST PROXIMITY SIGNAL
309
END

DOCK FOR A PORTABLE ELECTRONIC DEVICE

FIELD OF THE INVENTION

The present invention relates to a dock for a portable electronic device and, more particularly, to a dock for securing a notebook or laptop computer.

SUMMARY

In one embodiment, the invention provides a dock for a portable electronic device. The dock includes a base and an arm movably supported on the base. The arm has a ratchet gear set and a distal end configured to engage the portable electronic device to secure the portable electronic device to the base. The dock further includes a ratchet pawl positioned within the base. The ratchet pawl is movable between a first position, in which the ratchet pawl engages the ratchet gear set to inhibit movement of the arm relative to the base, and a second position, in which the ratchet pawl disengages the ratchet gear set to allow movement of the arm relative to the base. The dock further includes an electronic actuator operable to actuate the ratchet pawl from the first position to the second position.

In another embodiment, the invention provides a method of operating a dock for a portable electronic device. The portable electronic device is located between a first arm and a second arm of the dock. Each of the first arm and the second arm engage the portable electronic device to secure the portable electronic device to a base of the dock. An electronic actuator is actuated to disengage a ratchet pawl from a ratchet gear set on the first arm. In response to disengaging the ratchet pawl from the ratchet gear set, the first arm is biased away from the portable electronic device.

In yet another embodiment, the invention provides a dock for a portable electronic device having a base and an arm that engages the portable electronic device and slidably extends into the base. A controller is mounted within a base, a first fixed guide is coupled to the base, and a second fixed guide is coupled to the base and is spaced apart from the first fixed guide. A proximity sensor mounted within the arm is electrically connected to the controller via one or more electrical wires that are positioned between the first and second fixed guides. When the arm is in an extended position, the one or more electrical wires abut the first fixed guide. When the arm is in a retracted position, the one or more electrical wires abut the second fixed guide.

In yet another embodiment, the invention provides a dock for a portable electronic device. The dock includes at least one arm that slides relative to a base between a locked position and an unlocked position. The base includes an opening through which a cable lock is insertable. A lock plate is positioned within the base and engages the cable lock. A cam is located on the arm and engages the lock plate when the arm slides from the locked position to the unlocked position. When the cam engages the lock plate, the lock plate disengages the cable lock to permit removal of the cable lock from the dock.

In yet another embodiment, the invention provides a method of operating a dock. The method includes registering a remote apparatus with the dock via a proximity sensor, positioning an electronic device on the dock, and locking the dock to inhibit removal of the electronic device from the dock. The method also includes locating the remote apparatus adjacent the proximity sensor to unlock the dock, releasing the electronic device from the dock in response to locating the remote apparatus adjacent the proximity sensor, and unregistering the remote apparatus with the dock after the dock is unlocked.

Other aspects of the invention will become apparent by consideration of the detailed description and accompanying drawings.

BRIEF DESCRIPTION OF THE DRAWINGS

FIG. 14 is a flow chart illustrating another method of operating the dock of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
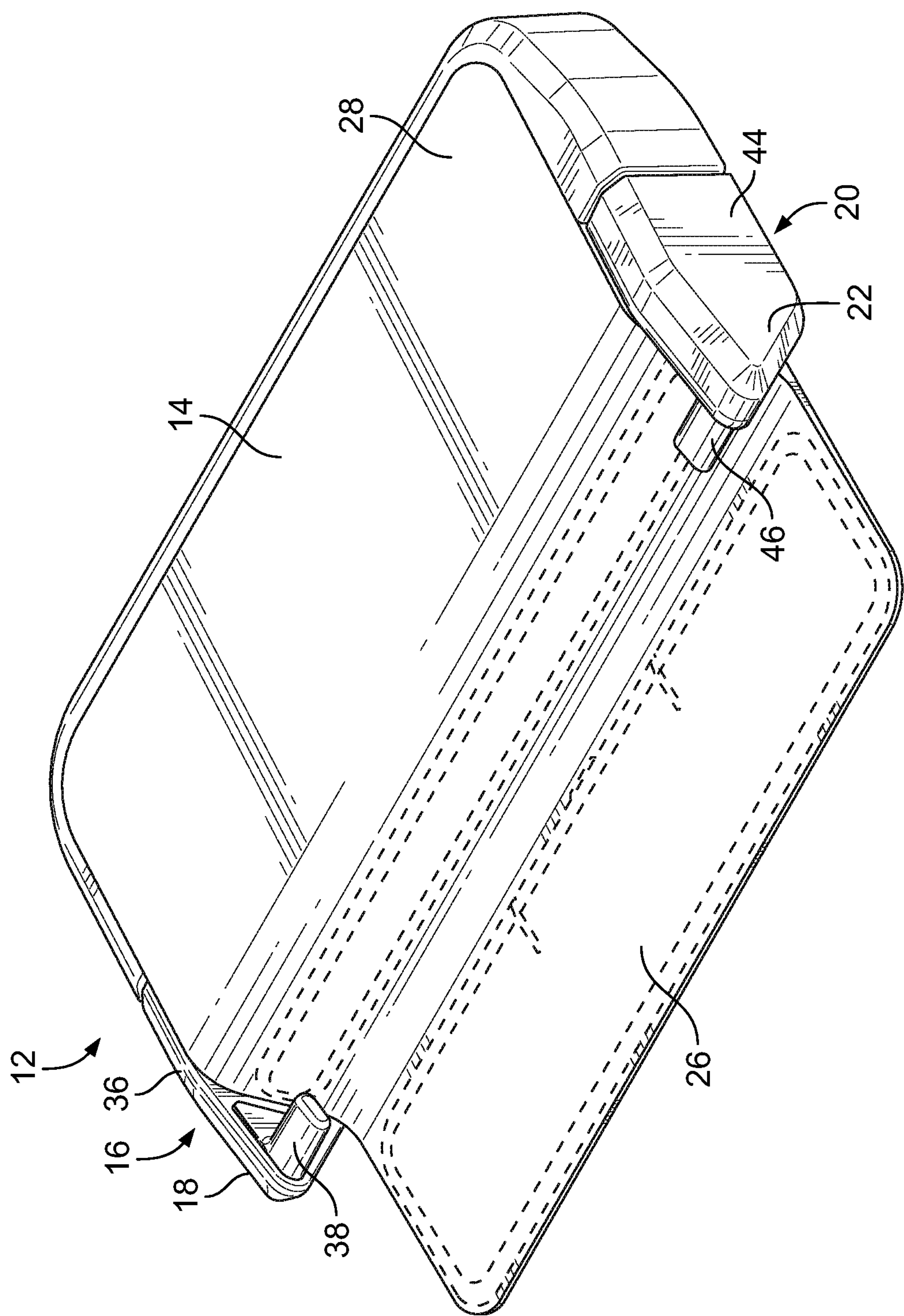
FIG. 1 is a perspective view of a dock for securing a portable electronic device.
Figure 11:
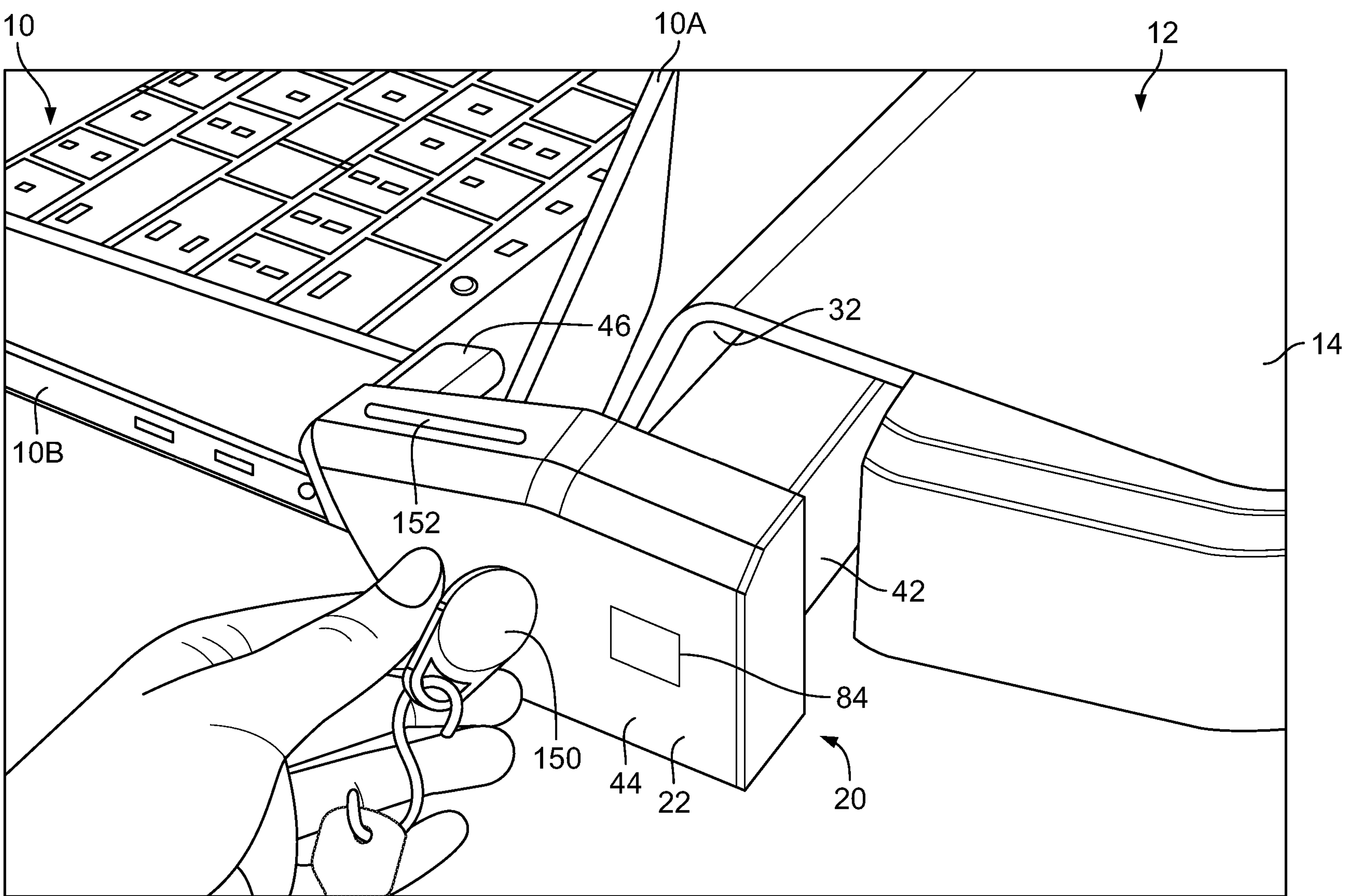
FIG. 11 is a perspective view of the dock and portable electronic device communicating with the remote apparatus.

FIG. 1 illustrates a dock 12 for use with a portable electronic device 10 (FIG. 11). The electronic device 10 is securable to the dock 12 via first and second arms 16, 20 that are movably supported on and extend into a base 14 and around a portion of the electronic device 10 to inhibit unwanted removal of the electronic device 10 from the dock 12. In the illustrated embodiment, the portable electronic device 10 is a portable computer such as a laptop or notebook computer. In other embodiments, the portable electronic device 10 may be another electronic device having a hinge. As shown in FIG. 11, the portable electronic device 10 includes a display portion 10A having a display device such as a screen, and an input portion 10B having an input device such as a keyboard. The display portion 10B is connected to and is rotatable relative to the input portion 10B via a hinge. An underside of the input portion 10B (e.g., an underside of a keyboard portion of the portable electronic device 10) rests upon a support platform 26 (FIG. 1) of the base 14 and a rear side of the display portion 10A is capable of resting against and abutting a housing 28 (FIG. 1) of the base 14 that extends upward from the support platform 26 to define a backrest for the electronic device 10.

Referring back to FIG. 1, the first arm 16 includes a first hook 18 and the second arm 20 includes a second hook 22. When the portable electronic device 10 is positioned on the dock 12 (e.g., against the support platform 26 and housing 28), the arms 16, 20 extend around opposing edges of the portable electronic device 10. More specifically, the arms 16, 20 extend around a portion of the rear, the respective side, and the front of the portable electronic device 10. In combination with the structure of the base 14, the arms 16, 20 inhibit unwanted removal of the portable electronic device 10 from the dock 12.

Figure 2:
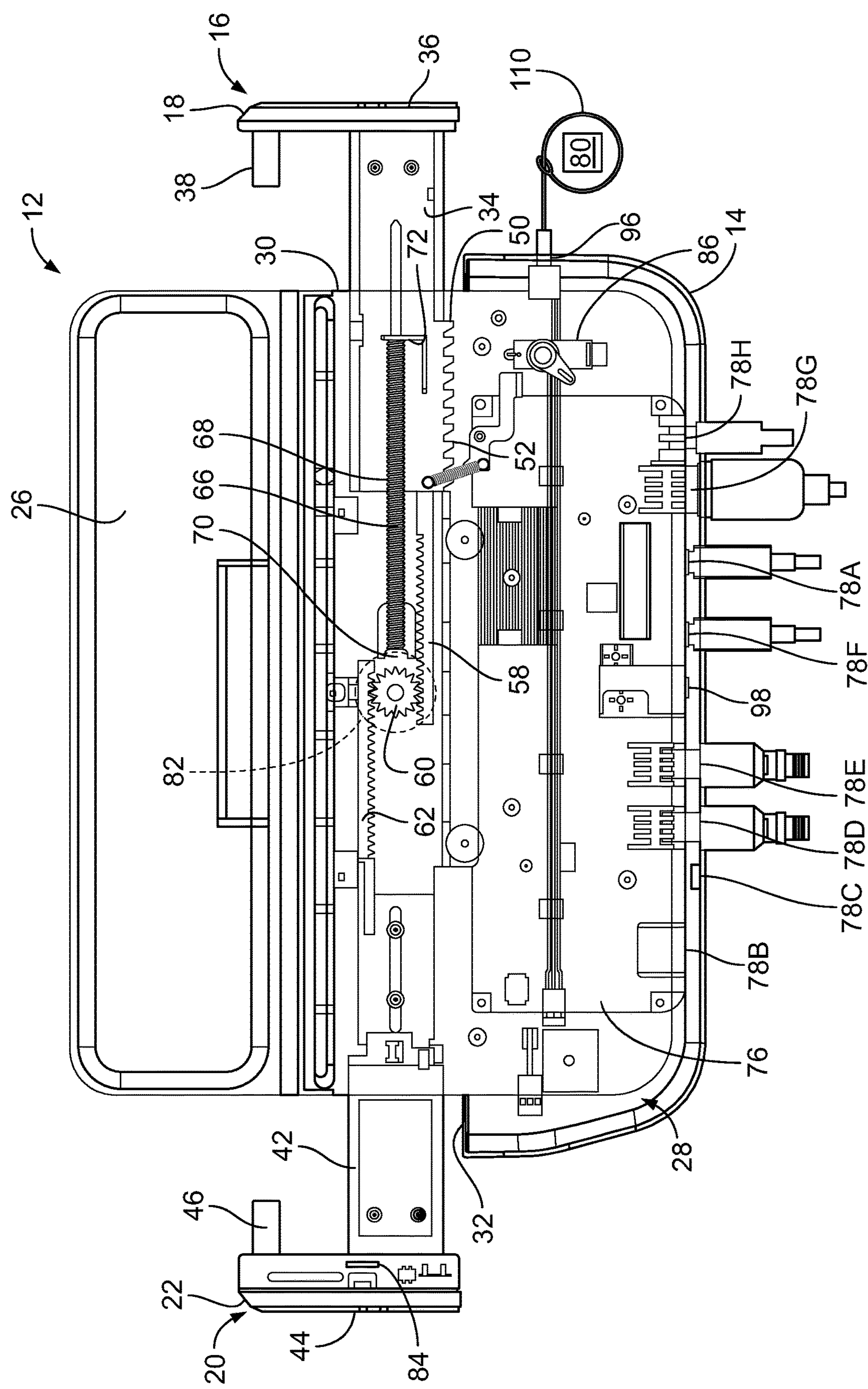
FIG. 2 is a top cross-sectional view of the dock illustrating select internals of the dock

As shown in FIG. 2, the base 14 includes a housing 28 defining an interior volume in which a plurality of electrical and mechanical components are located. The housing 28 includes openings 30, 32 on opposing sides of the base 14. The first arm 16 extends into and is slidable relative to the first opening 30, and the second arm 20 extends into and is slidable relative to the opposing second opening 32. In other embodiments, only one of the arms 16, 20 may be movable or slidable relative to the base 14, and the other one of the arms 16, 20 may be fixed relative to the base 14 (i.e., not slidable or movable). As the arms 16, 20 slide inward within the base 14 (i.e., the hooks 18, 22 translate closer to one another), the gap between the hooks 18, 22 decreases. When the gap between the hooks 18, 22 is greater than the width of the electronic device 10, this is an unlocked position in which the electronic device 10 is insertable and removable from the dock 12. When the gap between the hooks 18, 22 is less than the width of the electronic device 10, this is a locked position in which the electronic device 10 is inhibited from being removed from the dock 12. When the dock 12 is in the locked position with no electronic device 10 positioned on the dock 12, the hooks 18, 22 further inhibit insertion of an electronic device 10 onto the dock 12.

The first arm 16, as described below, is the left arm shown in FIG. 1 (e.g., the first arm 16 surrounds the left side of the screen of the electronic device 10 from a perspective in front of the screen). In other embodiments, the first arm 16 can be the right arm. Likewise, the second arm 20, as described below, is the right arm (e.g., the second arm 20 surrounds the right side of the screen of the electronic device 10 from a perspective in front of the screen). In other embodiments, the second arm 20 can be the left arm. In some embodiments, the dock 12 may only include one arm (e.g., the first arm 16), and the second arm 20 may be replaced by a hook or other suitable structure fixed to the dock 12.

The first arm 16 includes a main body 34 that extends into the first opening 30 and is capped by the first hook 18 at a distal end of the arm 16 (i.e., the end located outside of the housing 28 when assembled, as shown in FIGS. 1-2). The first hook 18 includes a plate 36 extending from and attached to the main body 34 and a protrusion 38 extending from the plate 36 parallel to the lengthwise direction of the main body 34. The first hook 18 is a fixed hook as the hook 18 is fixed (i.e., stationary) relative to the main body 34. When the portable electronic device 10 is mounted to the dock 12, the main body 34 is positioned behind the display portion 10B, the plate 36 extends around a side of the display portion 10B, and the protrusion 38 is positioned in front of a portion of the display portion 10B. In the illustrated embodiment, the first hook 18 is permanently attached to the main body 34, and the plate 36 of the first hook 18 is permanently attached to the protrusion 38. For example, the main body 34, the plate 36, and the protrusion 36 may be integrally formed, molded, welded, glued, bolted, or otherwise secured together to form the first arm 16.

The second arm 20 is similar to (and mirrored relative to) the first arm 16 except as otherwise described. The second arm 20 includes a main body 42 that extends into the second opening 32 and is capped by the second hook 22 at a distal end of the arm 20 (i.e., the end located outside of the housing 28 when assembled, as shown in FIGS. 1-2). Similar to the first hook 18, the second hook 22 includes a plate 44 extending from and attached to the main body 42 and a protrusion 46 extending from the plate 44. As shown in FIG. 2, the plate 44 of the second arm 20 has a greater thickness than the plate 36 of the first arm 16. The plate 44 defines a housing in which one or more electronic components are located. As described in greater detail below with respect to FIGS. 3A, 10, and 11, the plate 44 can house a proximity sensor, antenna, wireless transceiver, and/or other sensors configured to sense a presence of a remote apparatus 150, such as a key fob or smartphone.

As shown in FIG. 2, the main body 34 of the first arm 16 includes a ratchet gear set 50. The ratchet gear set 50 includes a plurality of teeth 52 extending along at least a portion of a length of the main body 34. The illustrated gear set 50 is formed on a rear-facing side (nearer the rear of the dock 12, away from the support platform 26) of the main body 34. As shown in greater detail in FIGS. 3B-4C, each tooth 52 includes an angled ramp portion and a vertical portion opposite the angled ramp portion.

The main body 34 of the first arm 16 further includes a rack 58 extending in the lengthwise direction of the arm 16 toward a center of the base 14. The rack 58 engages a pinion gear 60. The pinion gear 60 is positioned on, coupled to, and rotatable relative to the base 14. Therefore, when the first arm 16 is translated relative to the base 14, the rack 58 translates relative to the base 14 and relative to the pinion gear 60. As the rack 58 is engaged with the pinion gear 60, translation of the rack 58 results in rotation of the pinion gear 60.

The second arm 20 further includes a rack 62 that is engaged with the pinion gear 60 to couple movement of the first arm 16 to the second arm 20. Therefore, when the first arm 16 and the first hook 18 are translated inward toward the base 14 in a first direction, the second arm 20 and the second hook 22 are likewise translated inward toward the base 14 (e.g., decreasing the gap between the opposing hooks 18, 22). Similarly, when the first arm 16 and the first hook 18 are translated away from the base 14 in a second direction, the second arm 20 and the second hook 22 are likewise translated away from the base 14 (e.g., increasing the gap between the opposing hooks 18, 22).

In the illustrated embodiment, a dampener 82 is coupled to the pinion gear 60. The dampener 82 limits the rotational speed of the pinion gear 60, thereby dampening the motion (e.g., limiting the speed) of the arms 16, 20 as the arms 16, 20 translate relative to the base 14. As shown, the dampener 82 is coaxial with the pinion gear 60 and is located below the pinion gear 60 within the base 14. In the illustrated embodiment, the dampener 82 is a rotary dampener. In other embodiments, other suitable dampeners may be used, or the dampener 82 may be omitted.

The dock 12 further includes a spring 66 to bias the first arm 16 toward an unlocked position (i.e., biasing the first arm 16 and the first hook 18 away from the base 14). As shown, the spring 66 is a linear compression spring. The spring 66 is positioned around a post 68 (i.e., the post 68 is positioned within the inner diameter of the spring 66) to limit the movement of the spring 66 to linear motion parallel to the translation direction of the first arm 16. A first end of the spring 66 abuts a first stop 70 at the base 14 to define a limit for the spring 66 relative to the base 14. A second end of the spring 66 abuts a second stop 72 at the first arm 16. The second stop 72 defines a limit for the spring 66 relative to the first arm 16. The second stop 72 is movable with the arm 16 relative to the first stop 70 such that the spring 66 is able to expand and contract with translation of the first arm 16. As movement of the first arm 16 is coupled to movement of the second arm 20 via the pinion gear 60, when the spring 66 biases the first arm 16 and the first hook 18 away from the base 14, the spring 66 further biases the second arm 20 and the second hook 22 away from the base 14. Likewise, the spring 66 is compressed when either of the arms 16, 20 and hooks 18, 22 are moved toward the base 14. The spring 66 overcomes the friction of the dampener 82 to move the arms 16, 20 relative to the base 14 at a controlled and predetermined speed (based on the characteristics of the dampener 82). Such an arrangement inhibits the arms 16, 20 from abruptly popping out of the base 14 under the influence of the spring 66.

The dock 12 includes an electrical connector 78A for electrically coupling the portable electronic device 10 to the dock 12. The electrical connector 78A attaches to the portable electronic device 10 via a cable (e.g., a USB-C cable) or may otherwise be fixed within the base 14 to directly connect to a port of the portable electronic device 10. The base 14 further supports a plurality of electric components within the interior volume of the base 14. A circuit board or controller 76 includes a plurality of ports 78B-78H for electrically coupling electrical cables such as power cables, USB cables, HDMI cables to the electronic device 10 via the electrical connector 78A. As shown, the controller 76 includes a network port 78B, a headphone or speaker jack 78C, a first plurality of USB ports 78D, a second plurality of USB ports 78E, a USB-C port 78F, a video output port 78G (e.g., DisplayPort, HDMI port), and a power port 78H. The dock 12 therefore functions as a port replicator so that various electrical cables and peripherals (e.g., flash drives, keyboards, mice, etc.) can be plugged into ports 78B-78H of the dock 12 in addition to or instead of the ports on the portable electronic device 10, directly. Further, the dock 12 may support more ports 78B-78H than are found directly on the portable electronic device 10. In some embodiments, the rear of the dock 12 (near the ports 78B-78H) may further include an opening 98 (e.g., a K-slot) utilized to physically couple the dock 12 to an immovable object 80 via a security cable 110.

Figure 5:
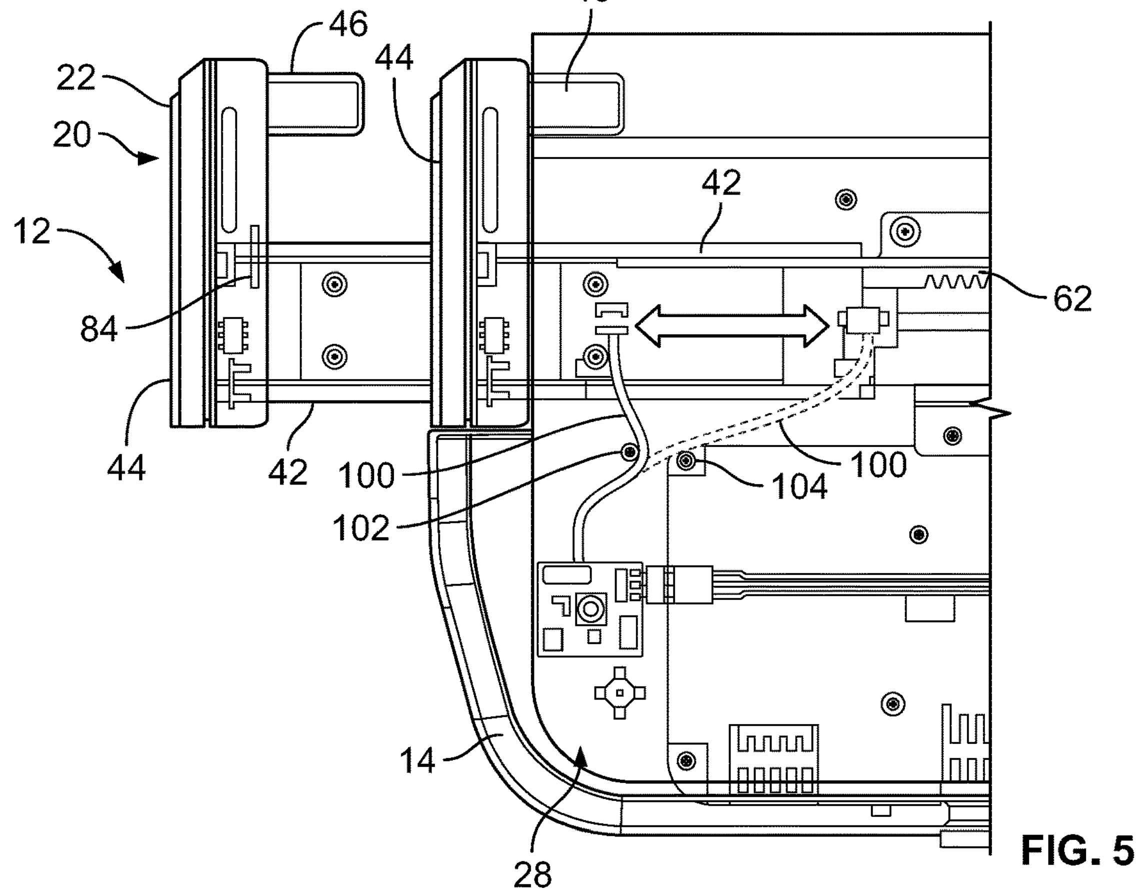
FIG. 5 is a fixed guide arrangement shown relative to an arm with an electrical wire in a first position and in a second position.
Figure 6:
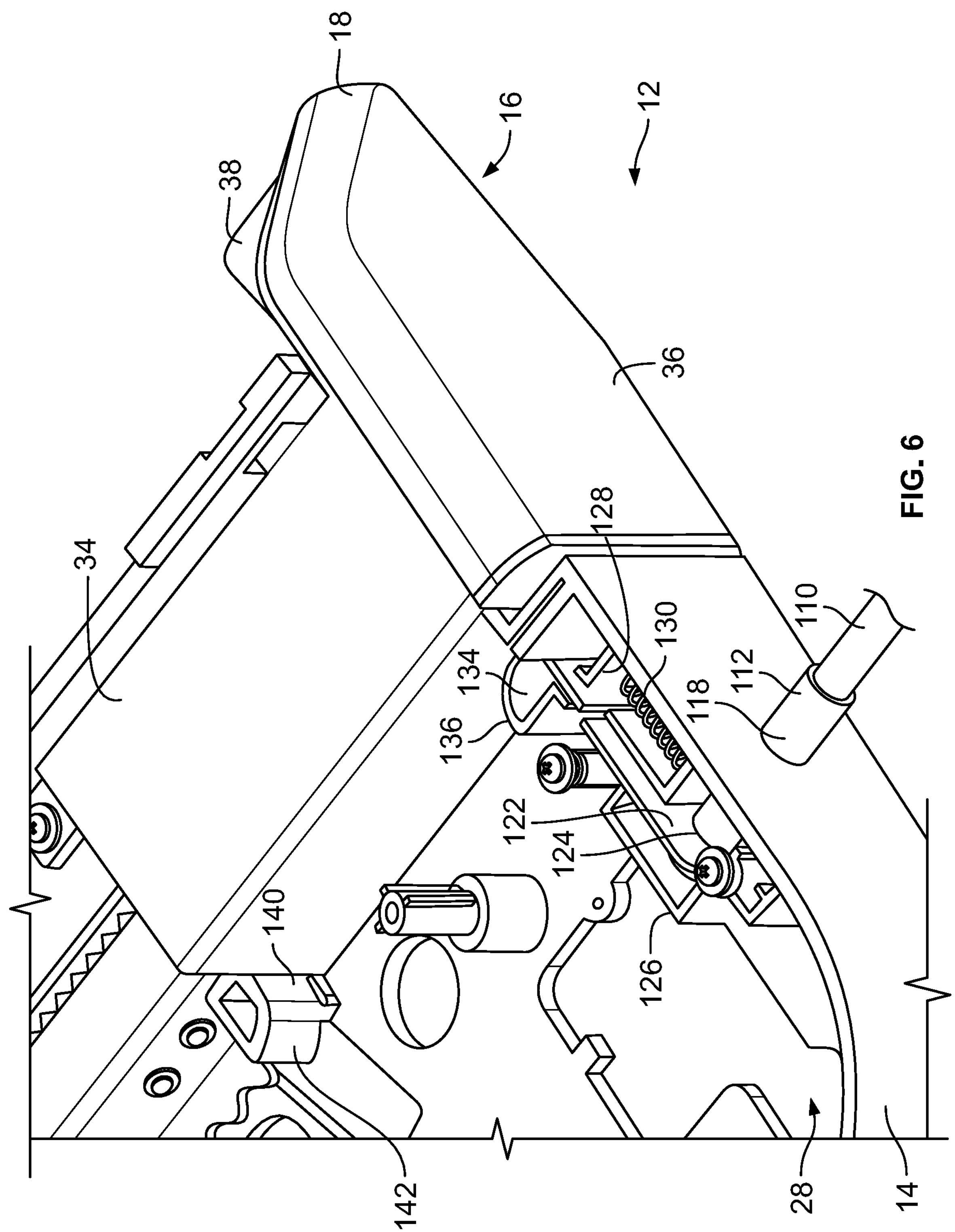
FIG. 6 is a perspective view of the dock with a lock cable in a locked position.

As discussed briefly above, the plate 44 of the second arm 20 includes an interior space for supporting another electric component: a proximity device 84 including one or more of a proximity sensor, an antenna, and a wireless transceiver. The proximity device 84 wirelessly communicates with a key fob or another remote apparatus 150 (FIG. 10) to provide a lock signal and/or unlock signal to the dock 12. The proximity device 84 is electrically coupled (e.g., via one or more electrical wires 100, as shown in FIG. 5) to the circuit board 76. In other embodiments, the proximity device 84 may be located within the base 14.

The base 14 of the dock 12 supports an electronic actuator 86 within the interior volume of the base 14. The electronic actuator 86 is actuatable via a signal from the proximity device 84, from the circuit board 76, and/or from the portable electronic device 10. The electronic actuator 86 may be embodied as, for example, an electric motor, such as a servomotor, or a solenoid. In other embodiments, other suitable electronic or electro-mechanical actuators may be used. As shown in FIGS. 3B-4C, the electronic actuator 86 includes an output shaft 88 that rotates about a rotational axis. An output member 90 is mounted to the output shaft 88. In the illustrated embodiment, the output member 90 includes a cam that projects radially from the output shaft 88. In other embodiments, the output member 90 may include other suitable projections or fingers.

A ratchet pawl 92 is positioned within the base 14 adjacent the electronic actuator 86 such that the output member 90 can interact with the ratchet pawl 92. The ratchet pawl 92 includes a first engagement surface 92A, a second engagement surface 92B, and a rotational axis 92C positioned therebetween. The first engagement surface 92A is located at a first end of the ratchet pawl 92 and includes a planar surface that is engageable by the output member 90 coupled to the electronic actuator 86. The second engagement surface 92B is located at a second end of the ratchet pawl 92, opposite the first end, and includes a tooth that engages the ratchet gear set 50.

Figure 3A:
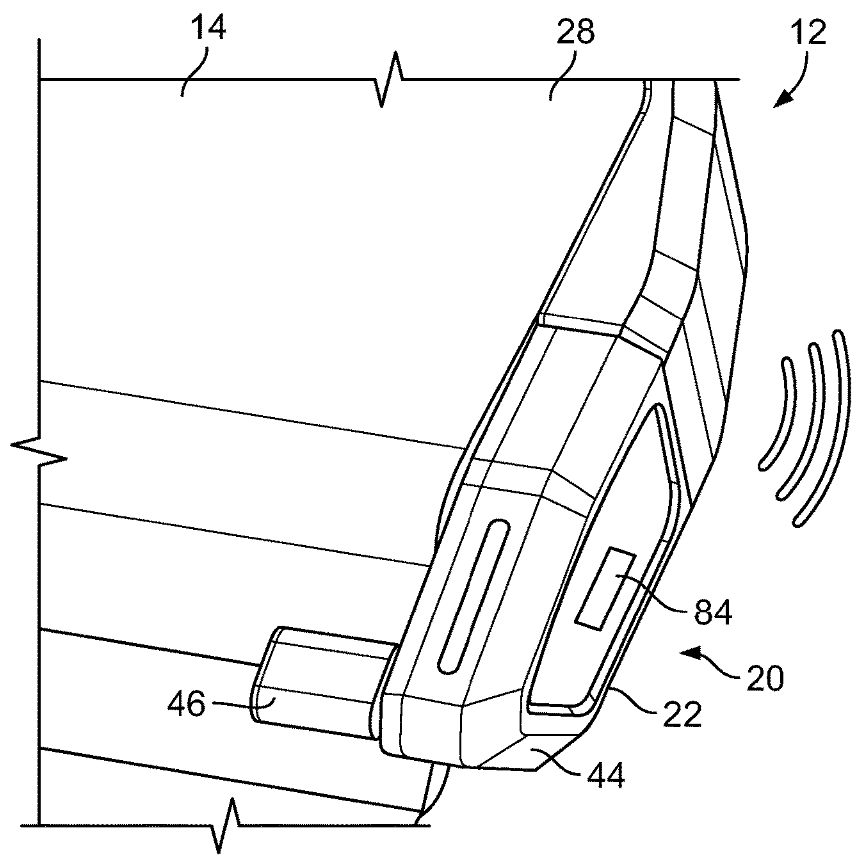
FIG. 3A is a perspective view of a portion of the dock shown in FIG. 1, specifically illustrating a portion of an arm of the dock.
Figure 3B:
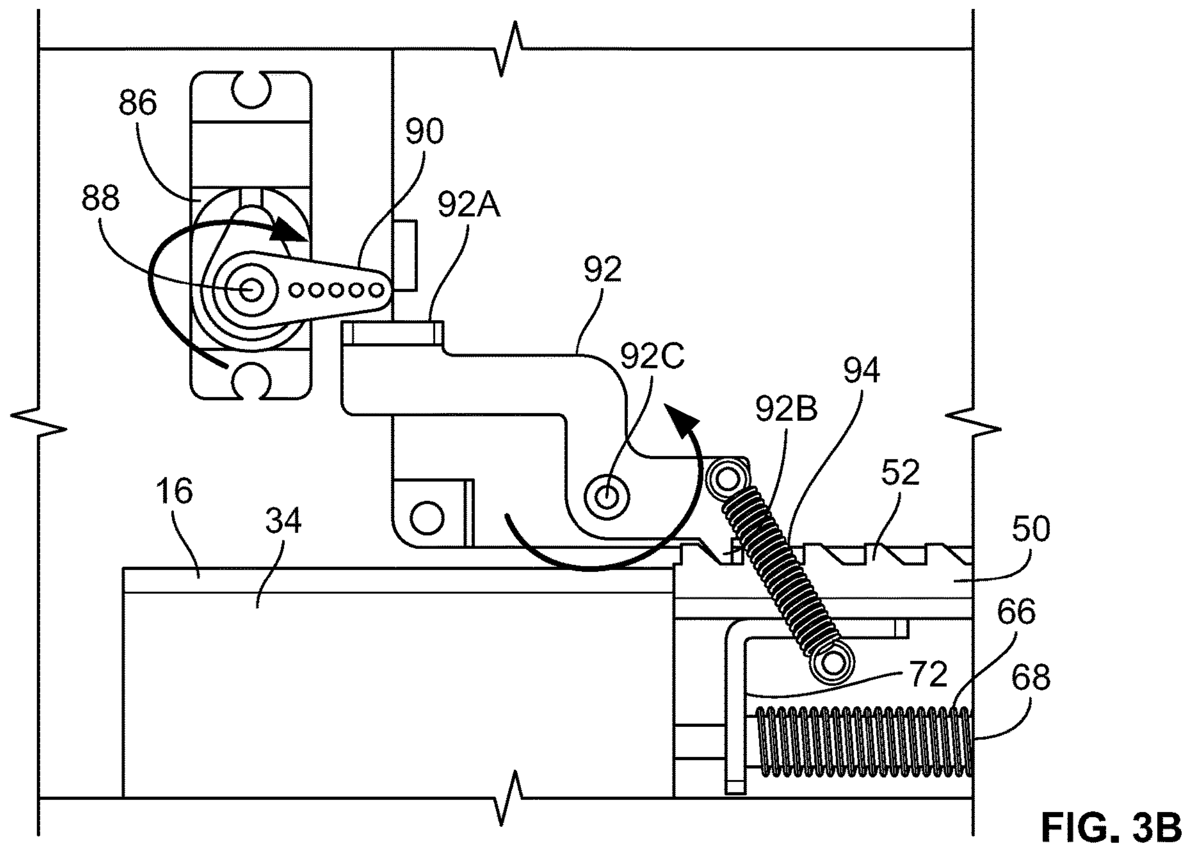
FIG. 3B is a top view of a ratchet pawl and ratchet gear set in an engaged position for locking the arm of the dock relative to a base.
Figure 3C:
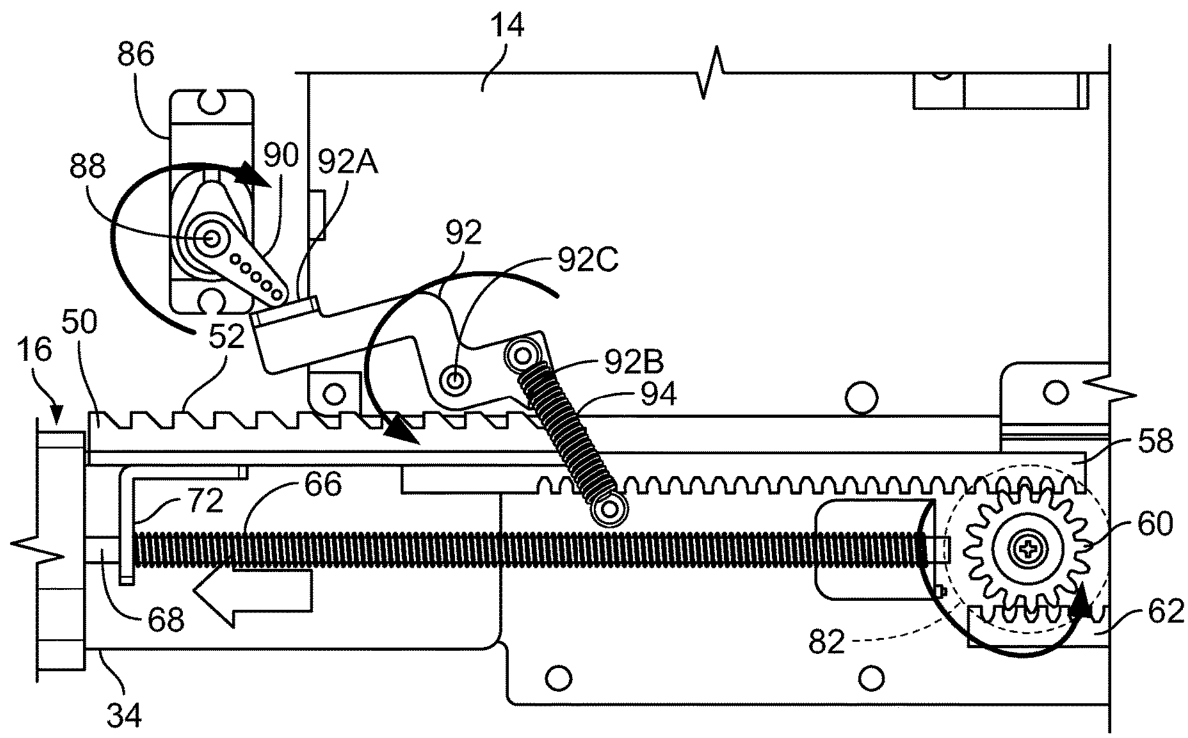
FIG. 3C is a top view of the ratchet pawl and ratchet gear set in a disengaged position.

The ratchet pawl 92 is movable (e.g., rotatable) relative to the base 14 and the electronic actuator 86 about the rotational axis 92C. In the illustrated embodiment, the ratchet pawl 92 is movable (e.g., rotatable) between an engaged position (FIGS. 3B, 3D, 4A, and 4C) and a disengaged position (FIG. 3C). In other embodiments, the ratchet pawl 92 may be slidable, translatable, or otherwise movable relative to the base 14 and ratchet gear set 50. In the engaged position, the second engagement surface 92B of the ratchet pawl 92 is engaged with the teeth 52 of the ratchet gear set 50. A spring 94 fastened to the ratchet pawl 92 and to the base 14 biases the ratchet pawl 92 into the engaged position. In the illustrated embodiment, the spring 94 is a tension spring extending between the ratchet pawl 92 and the base 14. In other embodiments, the spring 94 may be, for example, a torsion spring positioned about the rotational axis 92C. In the disengaged position, the second engagement surface 92B is not engaged with the ratchet gear set 50. As shown, the rotational axis 92C is nearer the second engagement surface 92B than the first engagement surface 92A, thereby providing a mechanical advantage for the motor 86 to overcome the bias of the spring 94 to move the ratchet pawl 92 from the disengaged position to the engaged position.

When the arms 16, 20 are locked relative to the base 14 (i.e., the ratchet pawl 92 is in the engaged position), a pulling force exerted outward on the arms 16, 20 does not move the arms 16, 20 relative to the base 14 because the tooth at the second engagement surface 92B is engaged with one of the teeth 52 of the ratchet gear set 50. In other words, a surface of the ratchet pawl 92 and a surface of the ratchet gear set 50 are oriented and engaged when a user exerts a pulling force on one of the arms 16, 20 so that the surfaces are parallel to one another and perpendicular to the pulling direction. In some embodiments, such as the illustrated embodiment, when a user exerts a pushing force on one or both of the arms 16, 20 to move the arms 16, 20 inward toward the base 14, the arms 16, 20 move inward regardless if the ratchet pawl 92 is in the engaged or disengaged position. Such an arrangement is due to the ratchet configuration of the pawl 92 and the gear set 50.

Figure 4A:
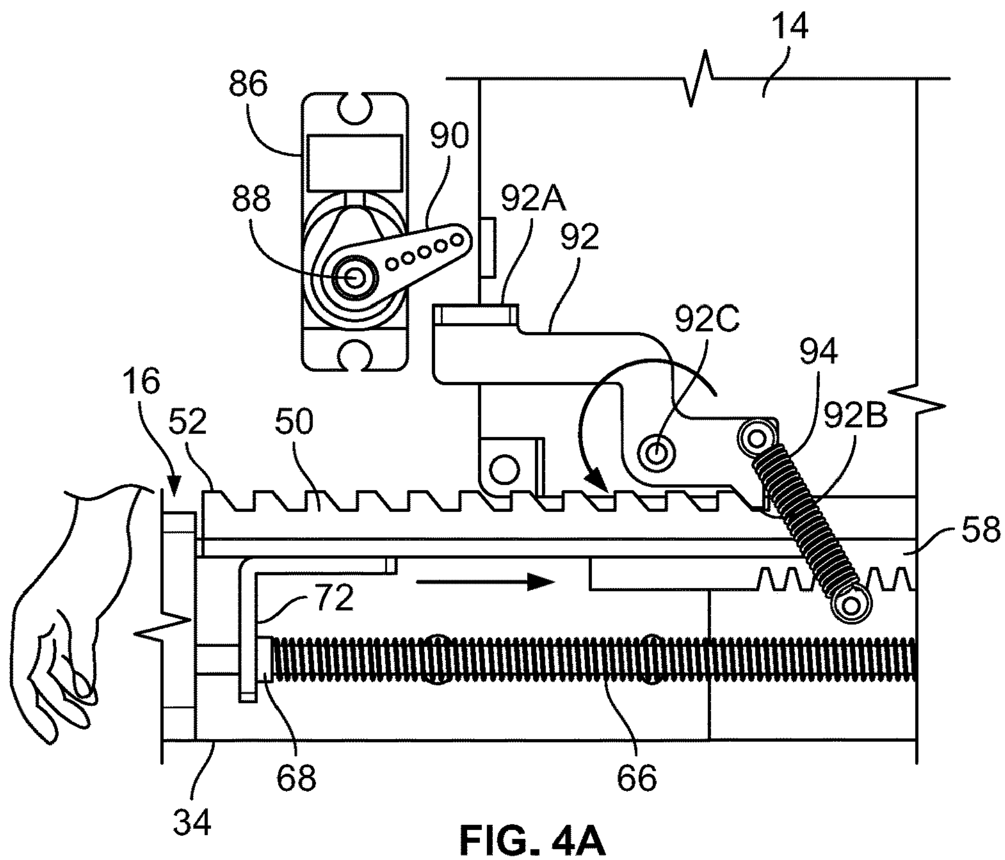
FIG. 4A is a first top view of the ratchet pawl and ratchet gear set when locking the portable electronic device to the dock.
Figure 4B:
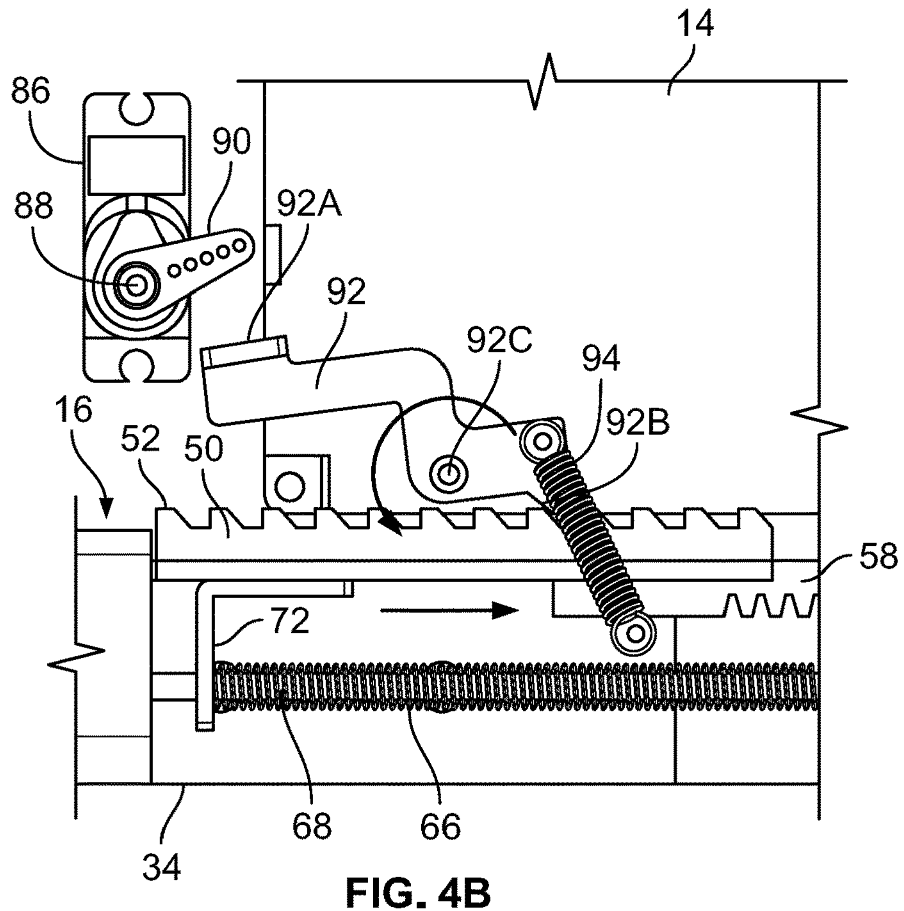
FIG. 4B is a second top view of the ratchet pawl and ratchet gear set when locking the portable electronic device to the dock.
Figure 4C:
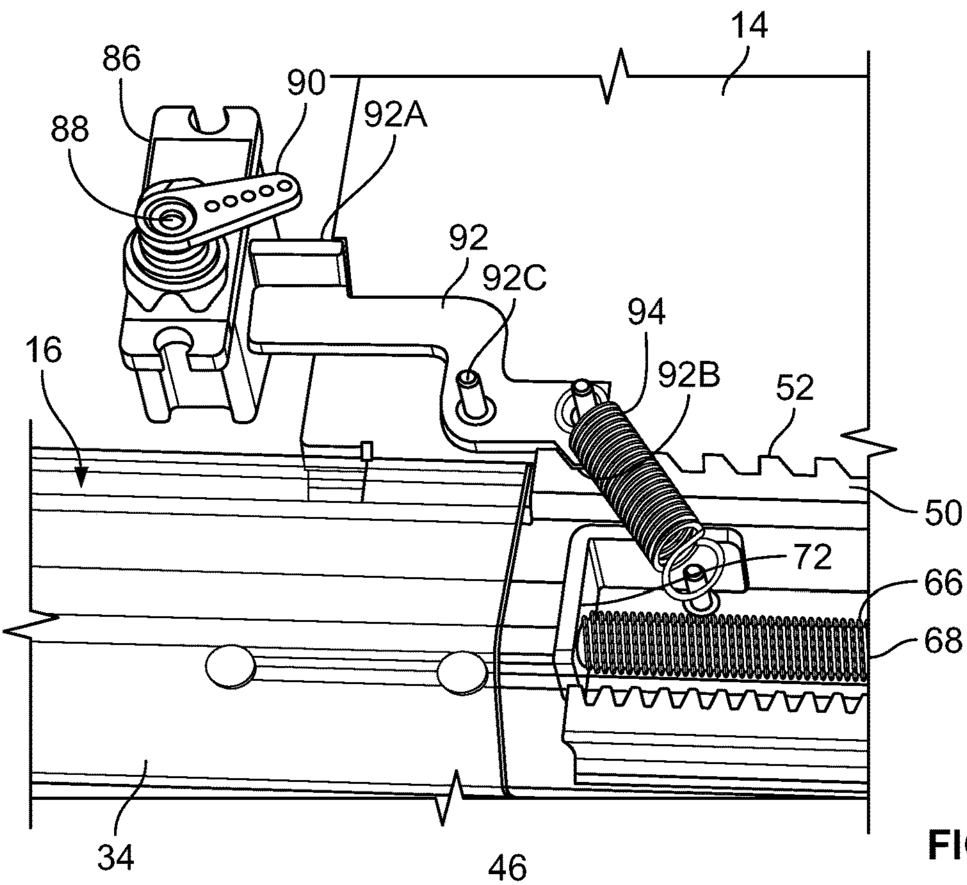
FIG. 4C is a third top view of the ratchet pawl and ratchet gear set when locking the portable electronic device to the dock.
Figure 13:
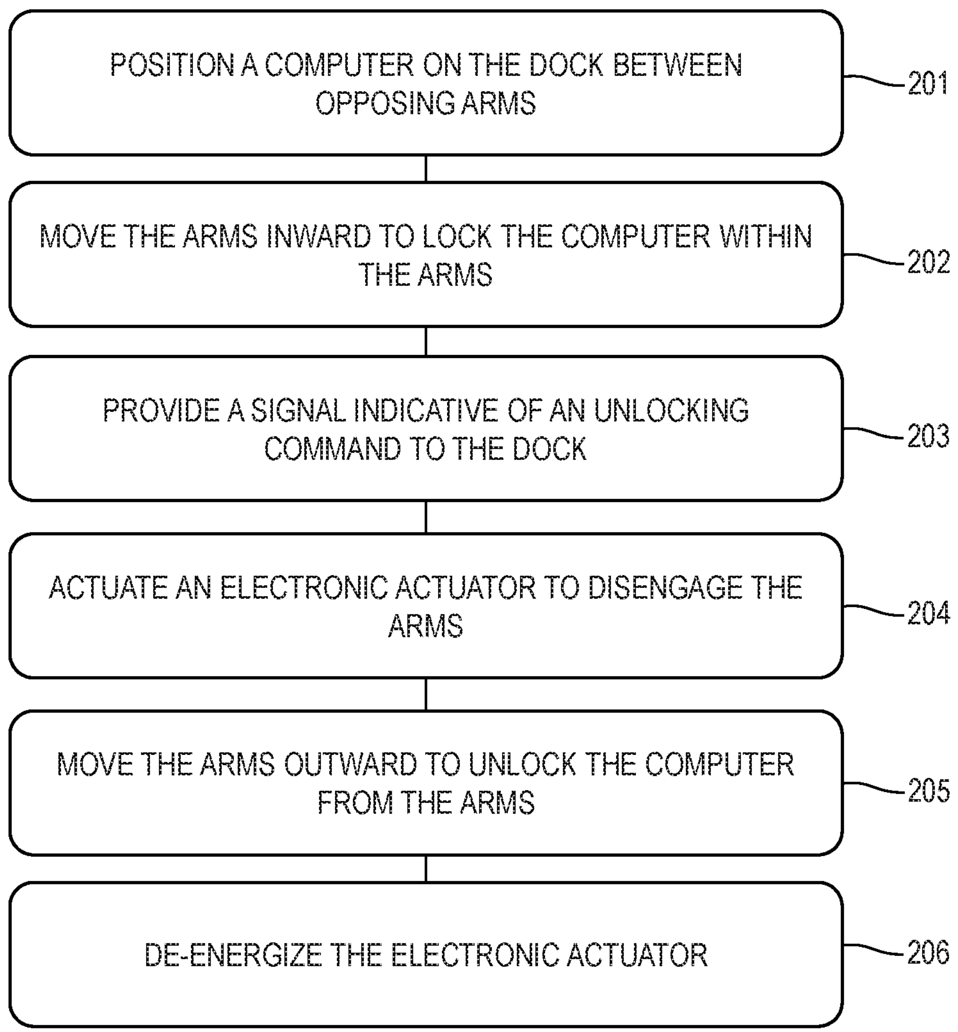
FIG. 13 is a flow chart illustrating a method of operating the dock of FIG. 1.

FIG. 13 identifies a method of operating the dock 12. To lock the portable electronic device 10 to the dock 12, the portable electronic device 10 is positioned on the support platform 26 of the base 14 between the opposing arms 16, 20, according to step 201. Then, according to step 202, the user is able to move the arm 16 inward, overcoming the bias of the spring 66 and temporarily overcoming the bias of the spring 94 as the second engagement surface 92B of the ratchet pawl 92 moves over individual teeth 52 of the ratchet gear set 50 (FIG. 4A). In contrast to the vertical/vertical interface between the ratchet pawl 92 and ratchet gear set 50 when moving the arm 16 outward, the interface between the ratchet pawl 92 and ratchet gear set 50 is a mating ramp arrangement that permits the user input force to move the ratchet gear set 50 relative to the ratchet pawl 92 (FIG. 4B). As the user moves the arm 16 inward, the ratchet pawl 92 climbs up consecutive teeth 52 of the ratchet gear set 50 until the hooks 18, 22 surround the portable electronic device 10 and prevent the removal of the portable electronic device 10 from the dock 12 (FIG. 4C). Once again, as the first and second arms 16, 20 are coupled by the pinion gear 60, when the first arm 16 and first hook 18 are pushed inward toward the base 14, the second arm 20 and second hook 22 are likewise moved inward toward the base 14.

To unlock the dock 12 and move the arms 16, 20 and hooks 18, 22 away from the base 14, a signal indicative of an unlocking command is sent to the dock 12, according to step 203. The proximity device 84 may wirelessly receive the signal (FIG. 3A). In alternative embodiments, the signal may be provided via an input in the dock 12 or the portable electronic device 10. When the signal is received by the dock 12 and interpreted by the controller 76, the controller 76 actuates the electronic actuator 86 to rotate the output shaft 88 and cam 90 in a first direction (clockwise, as shown in FIG. 3B) such that the cam 90 contacts the first engagement surface 92A of the ratchet pawl 92. The contact between the cam 90 and ratchet pawl 92 in combination with the continued actuation of the motor 86 rotates the ratchet pawl 92 about the rotational axis 92C, overcoming the spring bias of the spring 94. The cam 90 is rotated until the second engagement surface 92B is fully disengaged with the ratchet gear set 50 (until a clearance between the ratchet pawl 92 and ratchet gear set 50 permits full linear travel of the ratchet gear set 50 relative to the ratchet pawl 92), according to step 204 (and as illustrated in FIG. 3C).

When the second engagement surface 92B is disengaged from the ratchet gear set 50, the spring 66 biases the first arm 16 and first hook 18 outward away from the base 14 and away from the edge of the portable electronic device 10 previously captured by the first hook 18, according to step 205. As the first and second arms 16, 20 are coupled via the pinion gear 60, when the first arm 16 is biased outward by the spring 66, the pinion gear rotates, thereby moving the second arm 18 and second hook 22 away from the base 14 and away from the edge of the portable electronic device 10 previously captured by the second hook 22. Therefore, when the arms 16, 20 are moved outward, the portable electronic device 10 is removable from the dock 12.

Figure 3D:
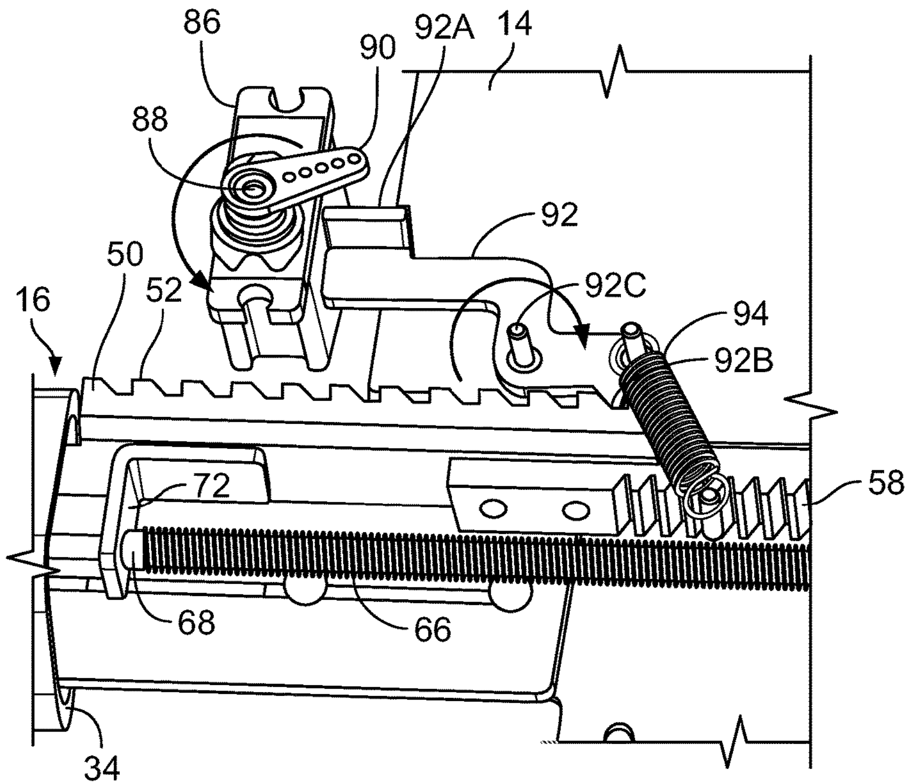
FIG. 3D is a perspective view of the ratchet pawl returned to the engaged position.

So that the electronic actuator 86 does not need to remain energized at all times when the dock 12 is unlocked, the electronic actuator 86 may rotate in a second direction (counterclockwise, as shown in FIG. 3D) once the arms have fully extended to disengage with the first engagement surface 92A, according to step 206. This rotation permits the bias of the spring 94 to rotate the ratchet pawl 92 about the rotational axis 92C and back into engagement with the ratchet gear set 50 (e.g., into engagement with the innermost tooth of the teeth 52 of the ratchet gear set 50). This position can be considered an at-rest position in which the spring 66 is fully decompressed and/or the arm 16 is not biased further outward.

As described above, the plate 44 of the second arm 20 contains one or more proximity devices 84 for wirelessly communicating with a remote apparatus 150 such as a key fob or a portable electronic device. In some embodiments, the proximity devices 84 may be electrically connected to the controller 76 via one or more wires 100 (FIG. 5). In the illustrated embodiment, the proximity device 84 and the wires 100 are located on an opposite side of the base 14 from the electronic actuator 86 and the ratchet pawl 92. This arrangement provides space so the two mechanisms do not physically interfere with each other.

Figure 12:
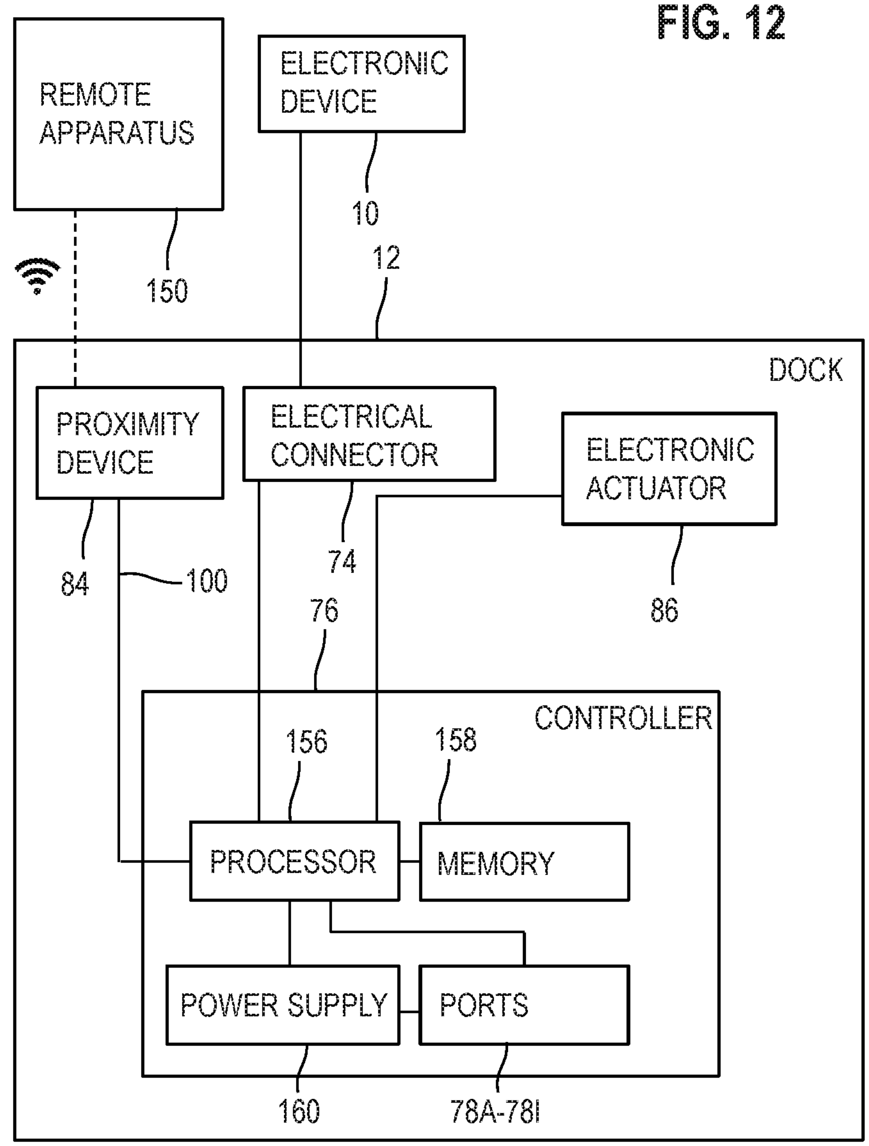
FIG. 12 is a schematic diagram illustrating various components of the dock of FIG. 1.

As shown schematically in FIG. 12, the controller 76 includes a processor 156 mounted within the base 14 and electrically coupled to the electronic actuator 86 and to the proximity device 84. The processor 156 stores wireless signals received by the proximity device 84 from the remote apparatus 150, as described above, within a memory 158 as a registered signal. The processor 156 is electrically coupled to the proximity device 84 via the wire or wires 100. The processor 156 is also in electrical communication with a power supply 160, the electronic device 10 (via the electrical connector 78A) and the ports 78B-78H. The power supply 160 may be provided by an external power source (e.g., a wall outlet) via the power port 78H. In some embodiments, the power supply 160 may also or alternatively be provided by an internal power source, such as a back-up battery.

As shown in FIG. 5, since the arm 20 is movable (e.g., slidable, translatable) relative to the base 14 and, therefore, also movable relative to the controller 76, the wires 100 include slack to allow the wired connection between the controller 76 (and specifically the processor 156) and the proximity device 84 to remain intact regardless of the position of the arm 20 (e.g., in the extended position, in the retracted position). With excess slack, the wires 100 could become entangled with other components within the base 14. With too little slack, the wires 100 could pull away from one or both of the controller 76 and the proximity device 84.

The dock 12 further includes first and second fixed guides 102, 104 to help limit and control movement of the wires 100. In the illustrated embodiment, the guides 102, 104 are physical protrusions extending from the base 14 and into the interior volume of the base 14. The fixed guides 102, 104 are fixed to the base 14 and/or the controller 76. In some embodiments, the fixed guides 102, 104 may span the height of the base 14, extending from a lower surface to an upper surface. The wires 100 pass between the fixed guides 102, 104 at a position between the electrical connection to the controller 76 and the electrical connection to the proximity device 84. The fixed guides 102, 104 limit the motion of the wires 100 when the arm 20 moves from the extended position to the retracted position and from the retracted position to the extended position. When the arm 20 is in the extended position, the wires 100 (as shown in solid lines) abut the first fixed guide 102. When the arm 20 is in the retracted position, the wires 100 (as shown in dashed lines) abut the second fixed guide 104. Therefore, the motion of the wires 100 is limited at a position between the two terminal ends of the wires 100 by the fix-blocks 102, 104 to a "windshield-wiper" type motion. The fixed guides 102, 104 inhibit tangling of the wires 100 within the base 104. Also, the fixed guides 102, 104 decrease the maximum force applied to the wires 100 at the respective ends of the wires 100 to decrease the likelihood of the wires 100 coming loose at the connections to the controller 76 and the proximity device 84 from repeated motion of the arm 20 relative to the base 14.

Figure 7:
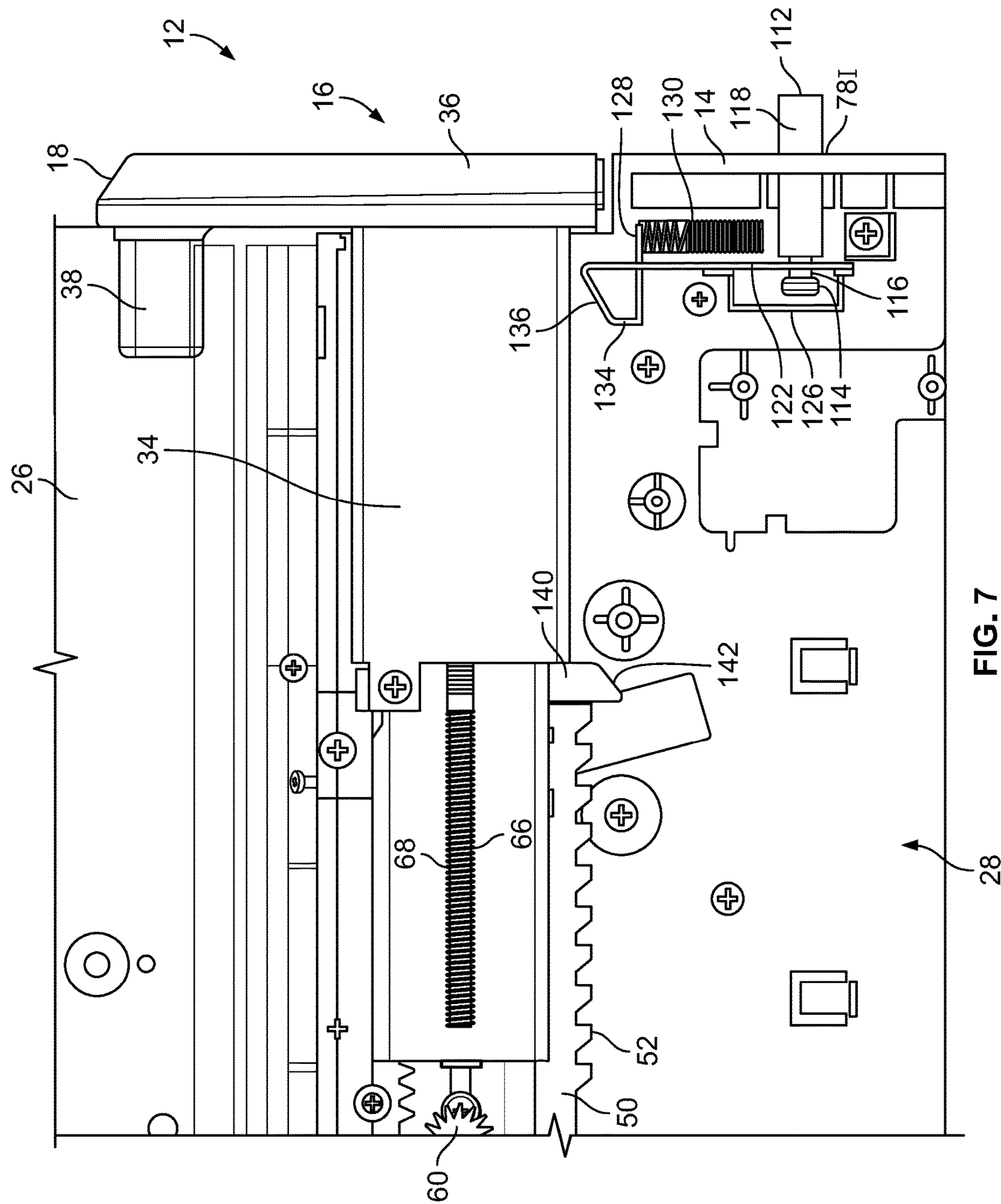
FIG. 7 is a top view of the dock with the lock cable in the locked position.

FIGS. 6-9 illustrate a system for locking the dock 12 to an immovable object 80 (FIG. 2). The system includes a security cable 110 having a lock head 112 that is insertable into an opening #96 of the dock 12. As shown in FIG. 7, the lock head 112 includes a head portion 114 of a first diameter, a neck portion 116 of a second diameter less than the first diameter, and a body portion 118 of a third diameter greater than the second diameter. Opening 96 has a diameter greater than the diameters of the lock head 112. The head portion 114 extends through the opening 96 and through an aperture 124 of a lock plate 122 positioned within the interior volume of the base 14 of the dock 12.

Figure 8:
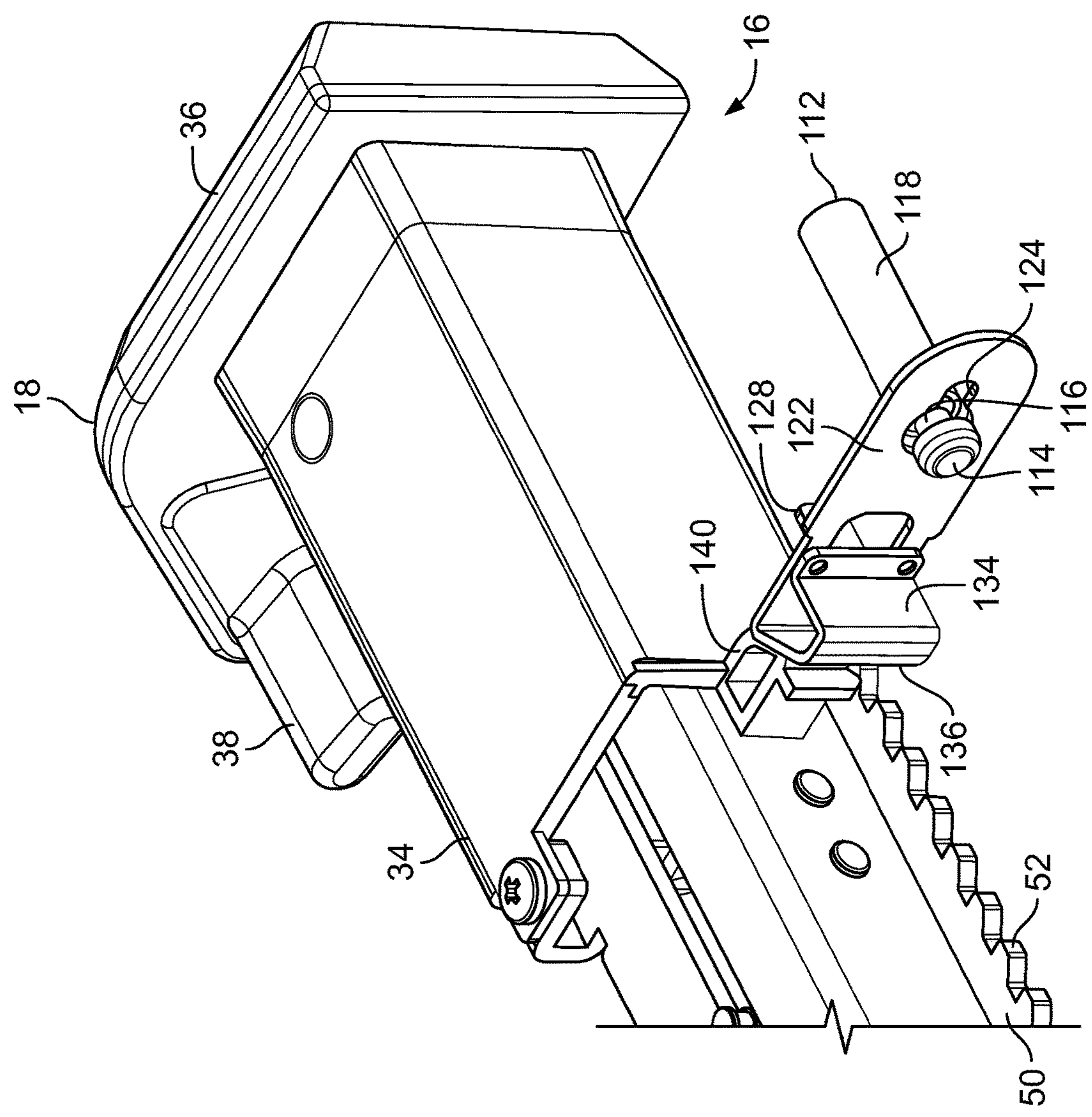
FIG. 8 is a perspective view of the lock cable in an unlocked position.

The lock plate 122 is a plate shown best in FIGS. 7 and 8. The lock plate 122 includes the aperture 124 that is aligned with the opening 96 such that axial insertion of the lock head 112 into the opening 96 is followed by axial insertion of the lock head 112 into the aperture 124. The aperture 124 is a keyhole aperture having a first portion that is sized to receive the head portion 114 of the lock head 112 and a second portion sized to receive the neck portion 116 of the lock head 112, but not the head portion 114 (or the body portion 118). A stop plate 126 is positioned beyond the aperture 124 (such that the aperture 124 is positioned between the stop plate 126 and opening 96). The stop plate 126 inhibits a user from inserting the lock head 112 of the security cable 110 beyond a desired depth. The desired depth is when the neck portion 116 of the lock head 112 is located within the aperture 124.

The lock plate 122 further includes a spring engagement feature 128 that engages a spring 130. The spring 130 biases the lock plate 122 to a locked position in which the second (narrower) portion of the keyhole aperture 124 is axially aligned with opening 96. An unlocked position (against the bias of the spring 130) is a position in which the first (larger) portion of the keyhole aperture 124 is axially aligned with opening 96. The lock plate 122 is limited to axial motion between the locked and unlocked positions by features within the base 114. The axial motion of the lock plate 122 is normal to a travel direction of the first arm 16.

When the lock plate 122 is in the unlocked position, the lock head 112 is removable and insertable into opening 96 and the aperture 124 of the lock plate 122. When the lock plate 122 is in the locked position, the lock head 112 is not removable from the aperture 124 of the lock plate 122 as the neck portion 116 of the lock head 112 is trapped within the second (narrower) portion of the keyhole aperture 124. A beveled distal end of the head portion 114 and/or the aperture 124 may permit axial insertion of the lock head 112 when the lock plate 122 is in the locked position by overcoming the bias of the spring 112. However, axial removal of the lock head 112 is still inhibited.

The lock plate 122 further includes an arm-engaging cam 134. The arm-engaging cam 134 includes an angled engagement surface 136 in non-parallel, facing relationship with a rear of the first arm 16. The engagement surface 136 is angled (e.g., not parallel, not perpendicular) relative to the axial travel direction of the lock plate 122 and the travel direction of the first arm 16.

The first arm 16 is provided with an arm cam 140 similar to the arm-engaging cam 134. The arm cam 140 includes an angled engagement surface 142 that is angled relative to the motive directions of the lock plate 122 and the first arm 16, and may be substantially parallel (±15 degrees) to the engagement surface 136 of the arm-engaging cam 134. When the first arm 16 moves from a locked (retracted) position to an unlocked (extended) position, as described above with respect to FIGS. 3A-3D, the engagement surfaces 136, 142 engage one another to move the plate 122 axially against the bias of the spring 130. In alternative embodiments, only one of the cams 134, 142 includes an angled surface, and the other includes a non-angled surface that engages the angled surface.

Figure 9:
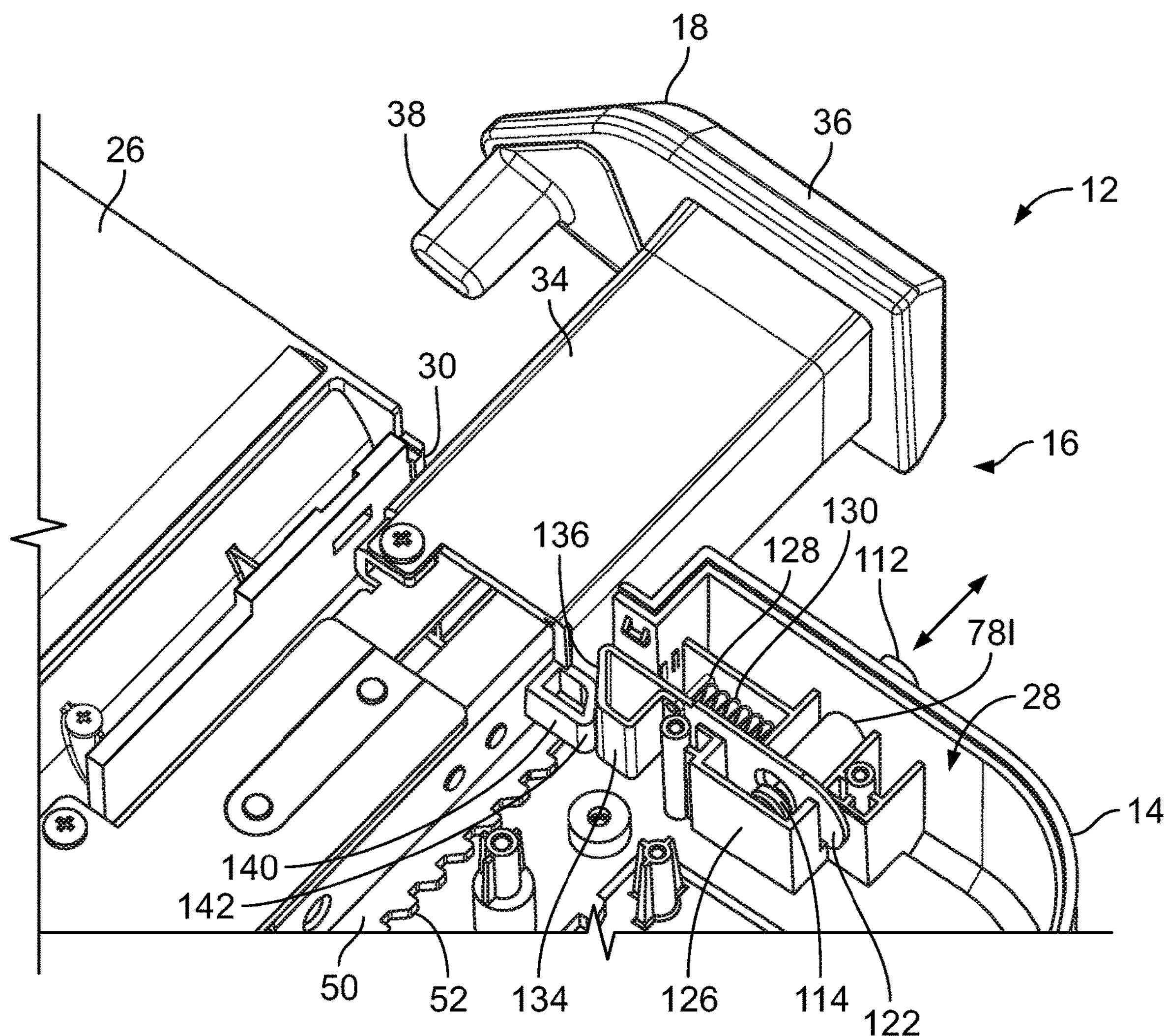
FIG. 9 is a perspective view of the dock with the lock cable in the unlocked position.

In operation, the security cable 110, and more specifically the lock head 112 of the security cable 110, is only removable when a user unlocks the dock 12 by extending the arm outward. The dock 12 is unlocked by a proximity device 84 or other unlocking device as described above. As the first arm 16 translates outward by the bias of the spring 66 to move the arm 16 and the hook 18 away from the base 14, the engagement surface 142 of the arm cam 140 contacts the engagement surface 136 of the arm-engaging cam 134, thereby generating a force having a component parallel to the compressive direction of the spring 130 high enough to move the lock plate 122 from the locked position (FIGS. 6-7) to the unlocked position (FIGS. 8-9). Once in the unlocked position, the first (wider) portion of the keyhole aperture 124 is aligned with opening 96 and the lock head 112 is removable from the lock plate 122, opening 96, and the dock 12.

To lock the security cable 110, and more specifically the lock head 112 of the security cable 110, to the dock 12 when the first arm 16 is in the unlocked (extended) position, the lock head 112 is inserted through opening 96 and through the aperture 124 in the lock plate 122. Then the arm 16 is moved inward to a locked position, thereby disengaging the arm cam 140 from the arm-engaging cam 134. When the cams 134, 140 are disengaged, the bias of the spring 130 translates the arm 16 from the unlocked position to the locked position where the neck portion 116 of the lock head 112 is positioned within the second (narrower) portion of the keyhole aperture 124, thereby prohibiting removal of the lock head 112 from the lock plate 122 and the dock 12.

To lock the security cable 110, and more specifically the lock head 112 of the security cable 110, to the dock 12 when the first arm 16 is in the locked (retracted) position, the arm 16 may need to be moved to an unlocked (extended) position. Alternatively, a beveled distal end of the head portion 112 and/or the aperture 124 may permit axial insertion of the lock head 112 when the lock plate 122 is in the locked position by overcoming the bias of the spring 112.

Figure 10:
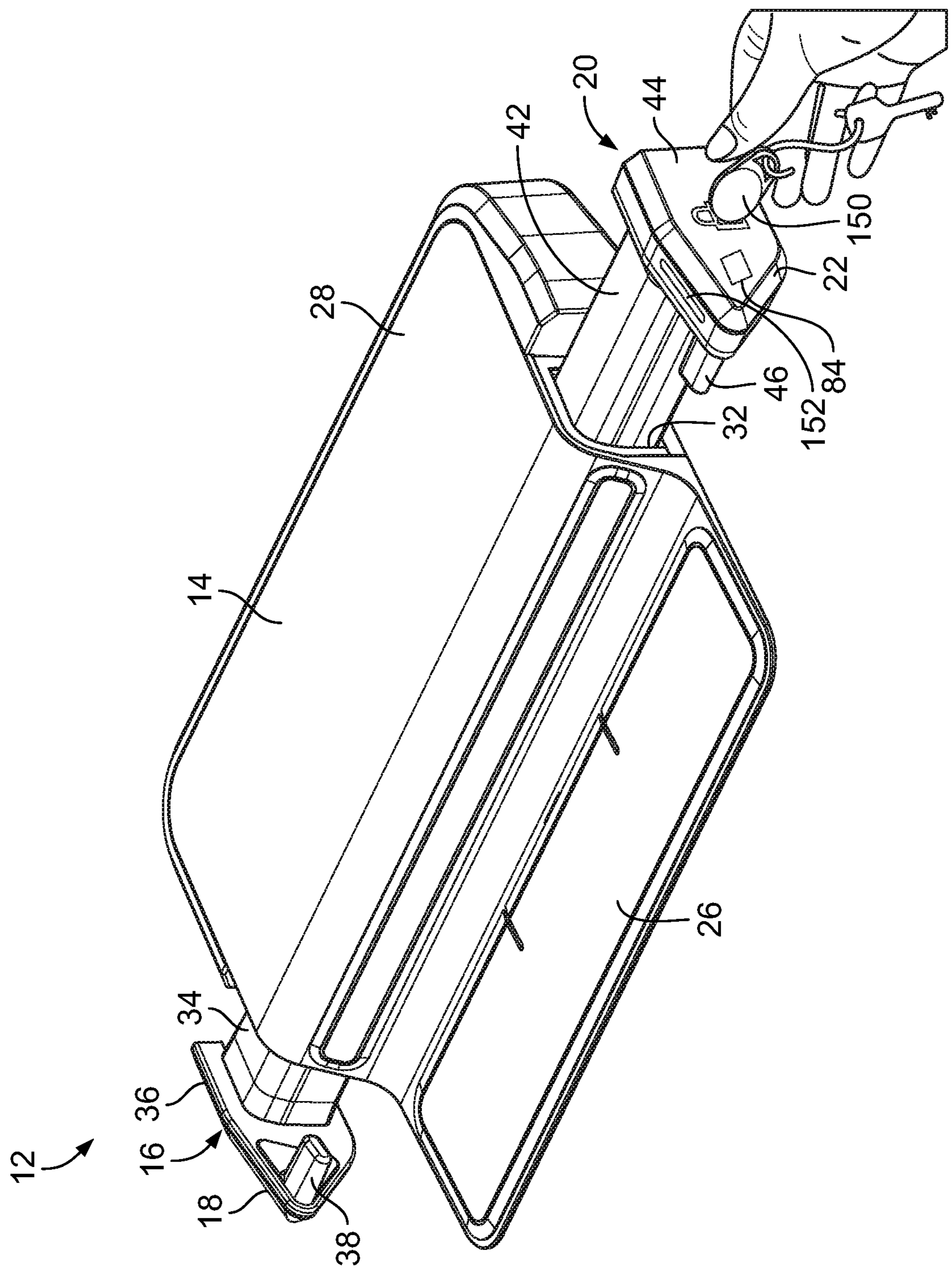
FIG. 10 is a perspective view of the dock communicating with a remote apparatus.

FIGS. 10-11 illustrate the dock 12 disclosed above with respect to FIGS. 1-9. As shown, a remote apparatus 150 (a fob, a key card, another portable electronic device such as a smartphone or cellphone, etc.) is utilized to lock/unlock the dock 12 described below. The remote apparatus 150 may be assigned to a specific portable electronic device 10 or user such that an administrator can match the remote apparatus 150 to a specific user or device.

FIG. 14 illustrates a method of operating the dock 12 using the remote apparatus 150. First, the user locates the remote apparatus 150 relative to the proximity device 84 (step 301). This may include contacting the plate 44 of the second arm 20 with the remote apparatus 150 or by locating the remote apparatus 150 within a specified distance (e.g., 10 centimeters, 5 centimeters, 1 centimeter) of the proximity device 84. The proximity device 84 recognizes (e.g., receives a signal from) the remote apparatus 150 and relays a signal to the processor 156 indicative of the specific remote apparatus 150 that is used (step 302). If the remote apparatus 150 is permitted to use the dock 12, the remote apparatus 150 is registered with the dock 12 (e.g., the processor 156 stores a signal from the proximity device 84 in the memory 158; step 303) and the user is provided with an audio or visual indication that the remote apparatus 150 is successfully paired with the dock 12. Such an indication may include the illumination of a light 152 (e.g., an LED) on the plate 44 of the arm 20 in a first color. In other embodiments, the indication may be provided by another suitable indicator, such as an audible noise or a message on the screen of the electronic device connected to the dock 12. Rejection of the remote apparatus 150 or a failure in pairing may result in the light 152 illuminating in a second color.

Once the remote apparatus 150 is paired with the dock 12, the arms 16, 20 of the dock 12 extend to the unlocked position (if not already in the unlocked position). The arms 16, 20 are unlocked by the processor 156 sending a signal to the electronic actuator 86 to disengage the ratchet pawl 92 from the ratchet gear set 50. In the illustrated embodiment, the arms 16, 20 are automatically extended to the unlocked position by the force of the spring 66 (FIG. 2) when the ratchet pawl 92 disengages the ratchet gear set 50. In other embodiments, the arms 16, 20 may be manually moved (e.g., pulled) apart when in the unlocked position. The arms 16, 20 may be prevented from locking if a remote apparatus 150 is not successfully paired with the dock 12. Once the arms 16, 20 of the dock 12 are in the unlocked position, the user can locate the portable electronic device 10 on the support platform 26 of the base 14 and move the arms 16, 20 inward toward the edges of the display portion 10A of the portable electronic device 10. Once the hooks 18, 22 extend around the portable electronic device 10, the portable electronic device 10 is secured to the dock 12 to inhibit the removal of the portable electronic device 10 from therefrom (step 304).

When the user has completed use of the dock 12 and wants to remove the portable electronic device 10 from the dock, the user once again places the remote apparatus 150 on or adjacent to the proximity device 84 (step 305). The processor 156 compares the new signal to the stored and registered signal (step 306). When the proximity device 84 and processor 156 recognize that the remote apparatus 150 is permitted to unlock the device (i.e., is the same remote apparatus 150 registered to the dock 12; step 307), the dock 12 provides a visual or audio indication (e.g., via the light 152), and the processor 156 instructs the electronic actuator 86 to actuate the ratchet pawl 92 to the disengaged position to release and unlock the arms 16, 20, as described above with respect to FIGS. 4A-4C (step 308).

In some embodiments, the dock 12 may also be unlocked by a master or administrator fob. Such a fob is useful if, for example, a user forgets or loses his/her fob. Additionally or alternatively, the dock 12 may include a mechanical interface that allows a user to unlock the dock 12 with a physical key.

In the illustrated embodiment, when the controller 76 receives the unlock instructions from the proximity device 84, the registered signal indicative of the specific remote apparatus is forgotten (i.e., removed from the memory 158) such that the remote apparatus 150 cannot be used to unlock the dock 12 without first re-registering the remote apparatus 150 with the dock 12 (step 309). Alternatively, another remote apparatus can be registered with the dock 12 by the next user. Therefore, once the electronic device 10 has been unlocked from the dock 12, the dock 12 does not remember the remote apparatus 150 or the device 10 or user associated with the remote apparatus 150. Such an arrangement allows the dock 12 to be used in "hoteling" situations, where the dock 12 is not assigned to a specific user.

The above-described dock 12 is a universal-type dock. For example, the arms 16, 20 allow different sizes of electronic devices to be secured by the dock 12. In some embodiments, the arms 16, 20 can expand to receive laptop computers having screen sizes between, for example, 10 inches and 20 inches. Additionally, the hooks 18, 22 allow the dock 12 to receive electronic devices having different thicknesses. The dock 12 also includes a universal connection (e.g., a USB port) to connect to different types of electronic devices. The universal connection allows the connected electronic device to be connected to multiple output ports on the dock 12 for port replication. Further, the dock 12 is unlocked and actuated by a wireless "key" (e.g., the fob 150), which may be less susceptible to picking, and may be assigned to multiple and/or different users.

Various features and advantages of the invention are set forth in the following claims.

What is claimed is:

1. A dock for a portable electronic device, the dock comprising:

a base;

an arm movably supported on the base, the arm having a ratchet gear set and a distal end configured to engage the portable electronic device to secure the portable electronic device to the base;

a ratchet pawl positioned within the base, the ratchet pawl being movable between a first position, in which the ratchet pawl engages the ratchet gear set to inhibit movement of the arm relative to the base, and a second position, in which the ratchet pawl disengages the ratchet gear set to allow movement of the arm relative to the base; and an electronic actuator operable to actuate the ratchet pawl from the first position to the second position, wherein the arm is a first arm, and further comprising a second arm coupled to a side of the base opposite from the first arm, wherein the second arm has a distal end configured to engage the portable electronic device to secure the portable electronic device to the base, wherein the second arm is movably supported on the base, wherein when the ratchet pawl is in the first position, the first arm and the second arm are only movable toward each other to secure the portable electronic device between the distal end of the first arm and the distal end of the second arm, and wherein when the ratchet pawl is in the second position, the first arm and the second arm are movable away from each other to release the portable electronic device, wherein the first arm includes a first gear rack, wherein the second arm includes a second gear rack, and further comprising a pinion gear engaging the first gear rack and the second gear rack.

2. The dock of claim 1, wherein the first arm is slidable in a first direction toward the base to secure the portable electronic device to the base and is slidable in a second direction away from the base to allow removal of the portable electronic device away from the base.

3. The dock of claim 2, wherein when the ratchet pawl is in the first position, the first arm is only movable in the first direction, and wherein when the ratchet pawl is in the second position, the first arm is movable in the second direction.

4. The dock of claim 2, further comprising a spring coupled to the first arm, wherein the spring biases the first arm in the second direction.

5. The dock of claim 1, wherein the distal end of the first arm includes a hook configured to wrap around a portion of the portable electronic device, and wherein the distal end of the second arm includes a hook configured to wrap around another portion of the portable electronic device.

6. The dock of claim 1, further comprising a dampener coupled to the pinion gear to dampen motion of the first arm and the second arm.

7. The dock of claim 1, wherein the distal end of the second arm includes a proximity sensor coupled to the electronic actuator, wherein the proximity sensor is operable to actuate the electronic actuator in response to a wireless signal.

8. The dock of claim 7, further comprising:

a processor mounted within the base and coupled to the electronic actuator and the proximity sensor;

a first fixed guide supported by the base adjacent the second arm;

a second fixed guide supported by the base adjacent the second arm, the second fixed guide spaced apart from the first fixed guide;

a wire extending between the second arm and the processor to electrically couple the proximity sensor to the controller, wherein the wire is positioned between the first fixed guide and the second fixed guide to restrain movement of the wire during movement of the second arm.

9. The dock of claim 1, wherein the ratchet pawl includes a first end having a tooth that engages the ratchet gear set and a second end having an engagement surface, and wherein the electronic actuator includes an output member that contacts the engagement surface to move the ratchet pawl from the first position to the second position.

10. The dock of claim 9, further comprising a spring coupled to the ratchet pawl to bias the ratchet pawl into the first position and the tooth into engagement with the ratchet gear set.

11. The dock of claim 9, wherein the ratchet pawl is pivotable about an axis located between the first end and the second end.

12. The dock of claim 1, wherein the electronic actuator includes a motor or a solenoid.

13. The dock of claim 1, wherein the base includes a housing, wherein the ratchet pawl and the electronic actuator are positioned within the housing, and wherein the first arm extends partially into the housing.

14. The dock of claim 13, wherein the housing further supports a plurality of ports configured to electrically communicate with the portable electronic device.

15. The dock of claim 13, wherein the base also includes a support platform extending from the housing, and wherein the support platform is configured to be positioned beneath and contact the portable electronic device.

16. The dock of claim 1, further comprising a proximity sensor supported by the base and electrically coupled to the electronic actuator, wherein the proximity sensor is operable to actuate the electronic actuator in response to a wireless signal.

17. The dock of claim 16, further comprising a processor supported by the base and electrically coupled to the electronic actuator and the proximity sensor, and a memory coupled to the processor, wherein the processor is operable to store a wireless signal received by the proximity sensor from a remote apparatus in the memory as a registered signal in response to receiving the wireless signal a first time, instruct the electronic actuator to actuate the ratchet pawl in response to receiving the wireless signal from the remote apparatus a second time, and remove the registered signal from the memory in response to receiving the wireless signal from the remote apparatus the second time.

18. The dock of claim 1, further comprising a cable extending from the base, wherein the cable is configured to engage an immovable object.

19. The dock of claim 18, wherein the cable includes a lock head insertable into an opening in the base, and further comprising a lock plate supported by the base adjacent the opening, wherein the lock plate is movable relative to the opening and the lock head between a first position, in which the lock plate engages the lock head to inhibit removal of the lock head from the base, and a second position, in which the lock plate disengages the lock head to allow removal of the lock head from the base.

20. The dock of claim 19, wherein the lock plate is actuated for movement from the first position to the second position by the first arm as the first arm moves away from the base.

21. A dock for a portable electronic device, the dock comprising:

a base;

an arm movably supported on the base, the arm having a ratchet gear set and a distal end configured to engage the portable electronic device to secure the portable electronic device to the base;

a ratchet pawl positioned within the base, the ratchet pawl being movable between a first position, in which the ratchet pawl engages the ratchet gear set to inhibit movement of the arm relative to the base, and a second position, in which the ratchet pawl disengages the ratchet gear set to allow movement of the arm relative to the base;

an electronic actuator operable to actuate the ratchet pawl from the first position to the second position;

a proximity sensor supported by the base and electrically coupled to the electronic actuator, wherein the proximity sensor is operable to actuate the electronic actuator in response to a wireless signal;

a processor supported by the base and electrically coupled to the electronic actuator and the proximity sensor; and a memory coupled to the processor, wherein the processor is operable to store a wireless signal received by the proximity sensor from a remote apparatus in the memory as a registered signal in response to receiving the wireless signal a first time, instruct the electronic actuator to actuate the ratchet pawl in response to receiving the wireless signal from the remote apparatus a second time, and remove the registered signal from the memory in response to receiving the wireless signal from the remote apparatus the second time.

22. A dock for a portable electronic device, the dock comprising:

a base;

an arm movably supported on the base, the arm having a ratchet gear set and a distal end configured to engage the portable electronic device to secure the portable electronic device to the base;

a ratchet pawl positioned within the base, the ratchet pawl being movable between a first position, in which the ratchet pawl engages the ratchet gear set to inhibit movement of the arm relative to the base, and a second position, in which the ratchet pawl disengages the ratchet gear set to allow movement of the arm relative to the base;

an electronic actuator operable to actuate the ratchet pawl from the first position to the second position;

a cable extending from the base, wherein the cable is configured to engage an immovable object and wherein the cable includes a lock head insertable into an opening in the base and a lock plate supported by the base adjacent the opening, wherein the lock plate is movable relative to the opening and the lock head between a first position, in which the lock plate engages the lock head to inhibit removal of the lock head from the base, and a second position, in which the lock plate disengages the lock head to allow removal of the lock head from the base.

23. The dock of claim 22, wherein the lock plate is actuated for movement from the first position to the second position by the arm as the arm moves away from the base.

* * * * *